United States Patent
Park et al.

(10) Patent No.: US 10,349,138 B2
(45) Date of Patent: *Jul. 9, 2019

(54) DIGITAL DEVICE AND METHOD OF PROCESSING A SERVICE THEREOF

(71) Applicant: LG ELECTRONICS INC., Seoul (KR)

(72) Inventors: Jihye Park, Seoul (KR); Jaeuk Kim, Seoul (KR); Daegu Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/677,494

(22) Filed: Aug. 15, 2017

(65) Prior Publication Data

US 2017/0366851 A1    Dec. 21, 2017

Related U.S. Application Data

(63) Continuation of application No. 14/459,064, filed on Aug. 13, 2014, now Pat. No. 9,769,529.

(30) Foreign Application Priority Data

Nov. 27, 2013  (KR) ................. 10-2013-0145312
Nov. 27, 2013  (KR) ................. 10-2013-0145313

(51) Int. Cl.
*H04N 7/173* (2011.01)
*H04N 21/472* (2011.01)
(Continued)

(52) U.S. Cl.
CPC ..... *H04N 21/472* (2013.01); *H04N 21/25816* (2013.01); *H04N 21/435* (2013.01); *H04N 21/478* (2013.01)

(58) Field of Classification Search
CPC ............... H04N 21/472; H04N 21/478; H04N 21/25816; H04N 21/435
(Continued)

(56) References Cited

U.S. PATENT DOCUMENTS 9,288,518 B2 *  3/2016  Sugiue ............. H04N 21/25875
2004/0078807 A1 *  4/2004  Fries ...................... H04N 7/165
725/14

(Continued)

FOREIGN PATENT DOCUMENTS

CN    102447966 A     5/2012
EP    2 400 445 A2   12/2011
EP    2 461 577 A1    6/2012

OTHER PUBLICATIONS

Samsung, "E-Manual," URL:https://support-us.samsung.com/nas/storage/201306131733051/\storage_attachmentAF6300_-_6350_e-Manual.pdf, Jun. 13, 2013, XP055440724, 169 pages.

*Primary Examiner* — Michael B. Pierorazio
(74) *Attorney, Agent, or Firm* — Birch, Stewart, Kolasch & Birch, LLP

(57) ABSTRACT

Various embodiment(s) for a service system, a digital device, and a method of processing a service therefor are disclosed in the present specification. In this case, according to one embodiment of the present invention, a method of processing a service in the digital device includes the steps of downloading and installing one or more STB applications configured to process the service, outputting an icon configured to approach the installed STB applications on a first service board supporting an RF mode, receiving a selection of an STB application icon among the STB applications, and outputting content processed by the selected STB application according to a result of a service authentication and a second service board for the selected STB application.

12 Claims, 28 Drawing Sheets

(51) Int. Cl.
*H04N 21/435* (2011.01)
*H04N 21/258* (2011.01)
*H04N 21/478* (2011.01)

(58) Field of Classification Search
USPC .......................................................... 725/110
See application file for complete search history.

(56) References Cited

U.S. PATENT DOCUMENTS

| | | | |
|---|---|---|---|
| 2009/0133073 A1* | 5/2009 | DaLaCruz | H04N 5/44543 |
| | | | 725/49 |
| 2010/0180314 A1* | 7/2010 | Kim | H04N 7/17318 |
| | | | 725/110 |
| 2011/0035780 A1* | 2/2011 | Cedervall | H04N 21/443 |
| | | | 725/110 |
| 2011/0119702 A1 | 5/2011 | Jang et al. | |
| 2012/0019732 A1 | 1/2012 | Lee et al. | |
| 2012/0090004 A1 | 4/2012 | Jeong | |
| 2012/0139945 A1 | 6/2012 | Choi | |
| 2013/0271477 A1 | 10/2013 | Shin | |
| 2013/0291003 A1 | 10/2013 | Lee | |
| 2014/0059599 A1* | 2/2014 | Sirpal | G06F 3/017 |
| | | | 725/37 |
| 2015/0058872 A1 | 2/2015 | Earle | |

\* cited by examiner

FIG. 7
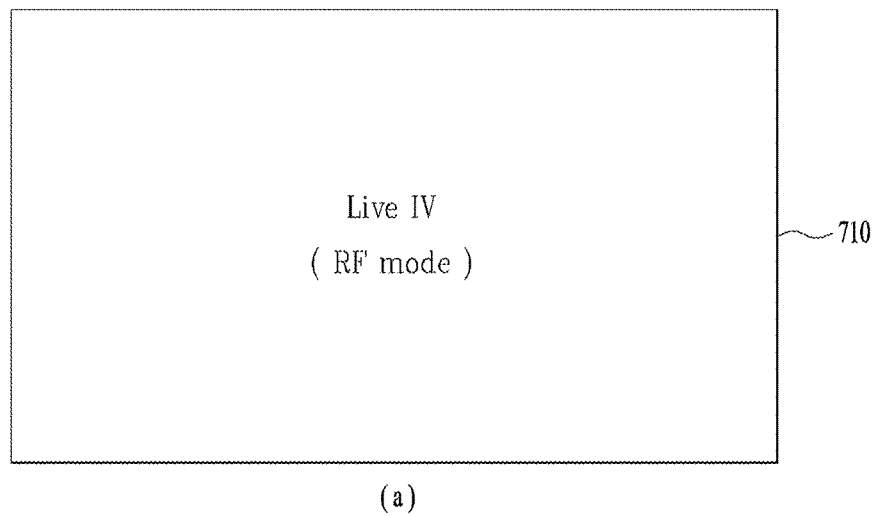
(a)
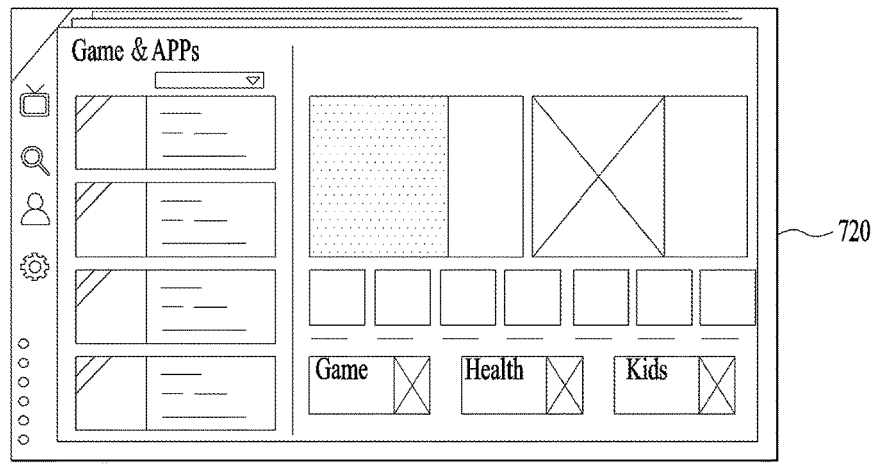
(b)
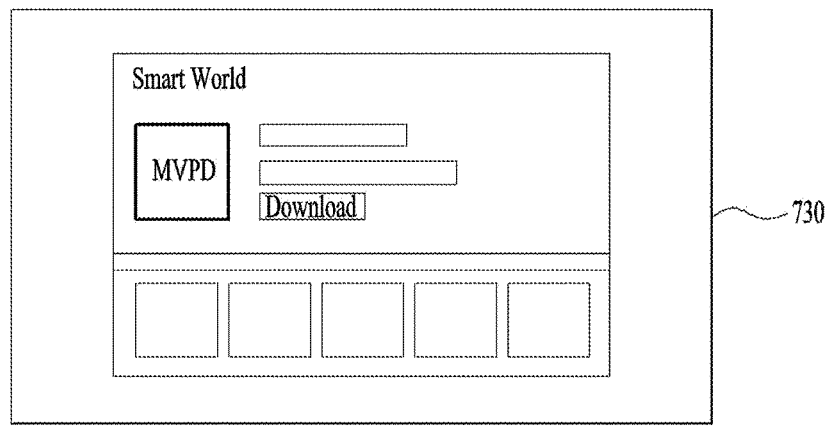
(c)

FIG. 9
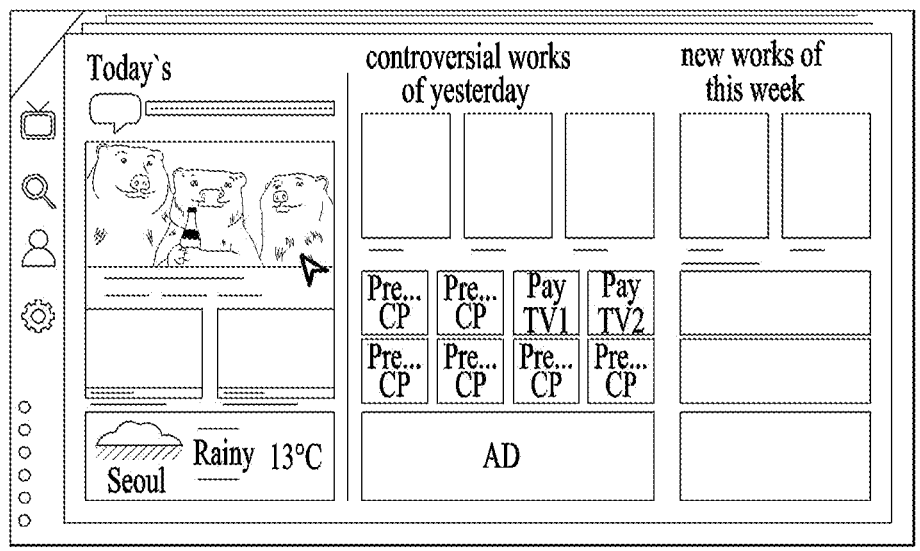
(a)
select PIG
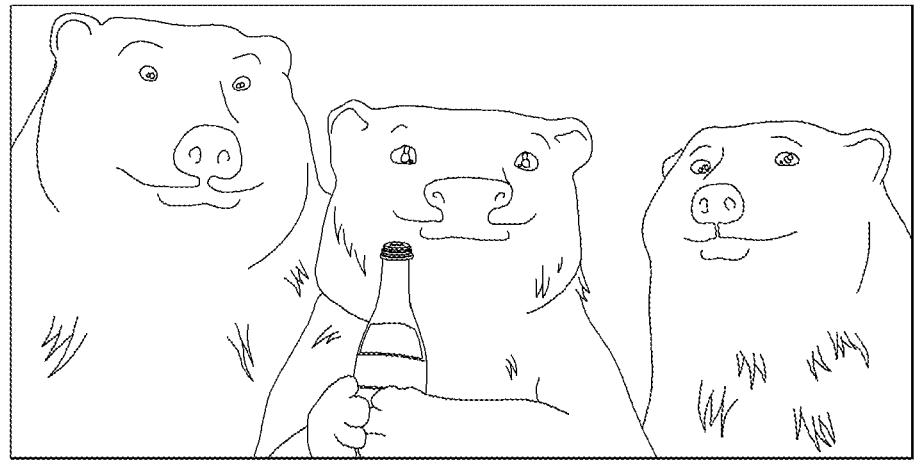
(b)

FIG. 13
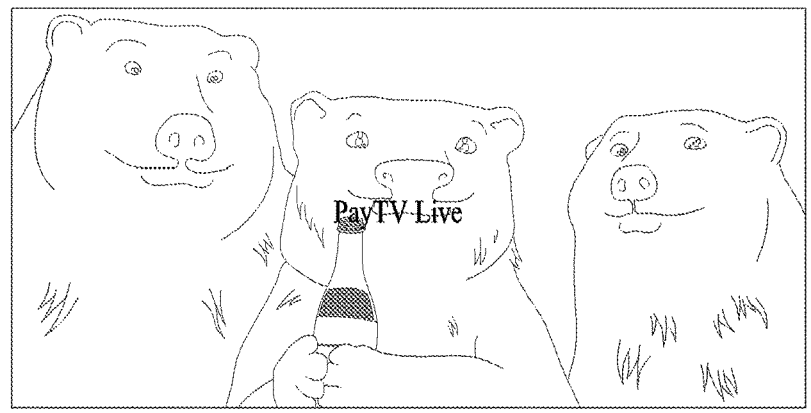
(a)
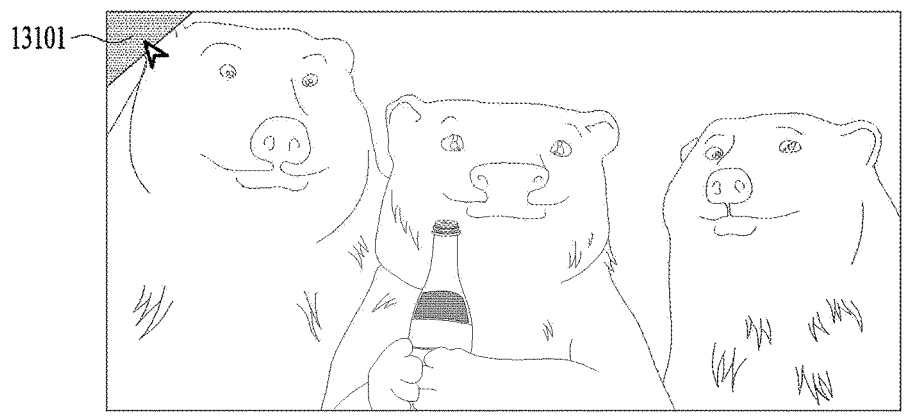
(b)
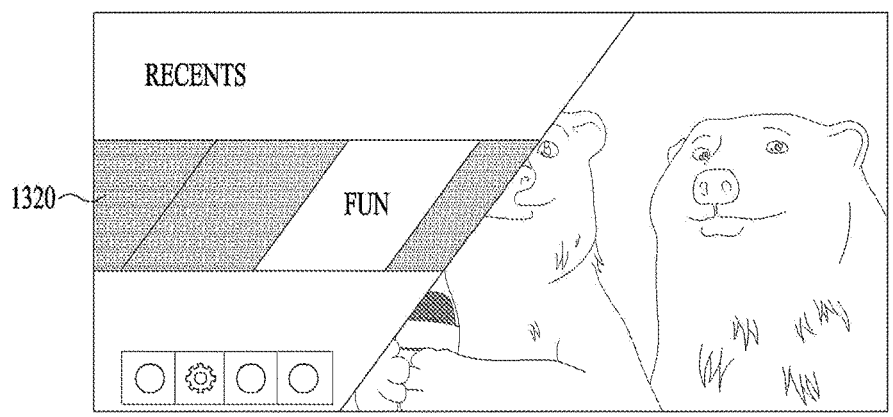
(c)

FIG. 22
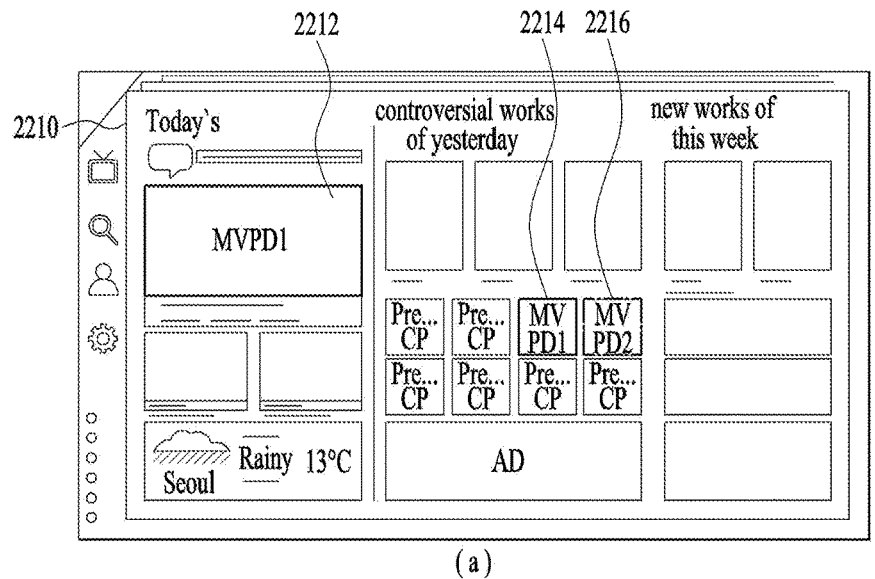
(a)
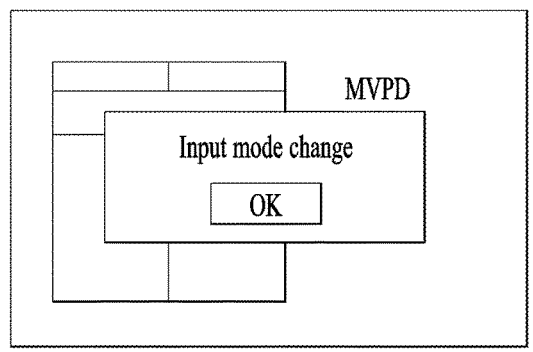
(b)
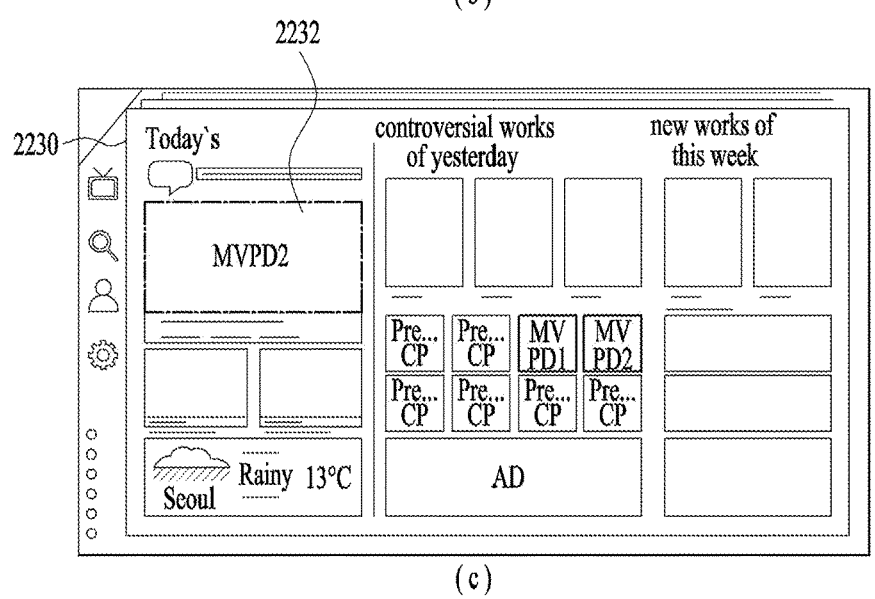
(c)

FIG. 29

| service A (Preview) | | H1 | H2 | H3 | H4 | H5 | H6 |
|---|---|---|---|---|---|---|---|
| | S1 | A1 | - | ★A3 | - | - | - |
| | S2 | - | A2 | - | A5 | - | ☺A7 |
| information providing area | S3 | - | - | ☺A4 | A6 | - | A8 |

| service B (Preview) | | H1 | H2 | H3 | H4 | H5 | H6 |
|---|---|---|---|---|---|---|---|
| | S1 | - | B1 | - | ★B4 | - | - |
| | S2 | - | - | B2 | - | B5 | ☺B7 |
| information providing area | S3 | - | - | ☺B3 | - | B6 | - |

DIGITAL DEVICE AND METHOD OF PROCESSING A SERVICE THEREOF

CROSS-REFERENCE TO RELATED APPLICATIONS

This application is a Continuation of U.S. patent application Ser. No. 14/459,064 filed on Aug. 13, 2014, which claims the benefit of the Korean Patent Application No. 10-2013-0145312, filed on Nov. 27, 2013, and No. 10-2013-0145313, filed on Nov. 27, 2013, which are hereby incorporated by reference as if fully set forth herein.

BACKGROUND OF THE INVENTION

Field of the Invention

The present invention relates to a digital device and a method of processing a service thereof, and more particularly, to a method of processing a charged service in the digital service and apparatus therefor.

Discussion of the Related Art

Compared to a legacy analog broadcasting, a digital broadcasting has less data loss since the digital broadcasting has a noise robust feature. The digital broadcasting is advantageous in performing an error correction and can provide a clear picture since a high resolution can be implemented by the digital broadcasting. Moreover, the digital broadcasting can implement a bi-directional service as well.

The digital broadcasting has enabled such various services as a real-time broadcasting for a digital content, a content on demand (CoD), and the like to be performed via an internet protocol (IP) network as well as a legacy terrestrial, a satellite, and a cable broadcasting.

Meanwhile, conventionally, it was mandatory for a user to have a physical set-top box (STB) provided by a service provider to receive a charged broadcasting service. Yet, since it is necessary to put a human resource in installing the physical STB, it takes time and cost money. Moreover, since there is a limit to update, upgrade, or maintain the physical STB, it may cause inconvenience to the user.

SUMMARY OF THE INVENTION

Accordingly, the present invention is directed to an apparatus and method thereof that substantially obviate one or more problems due to limitations and disadvantages of the related art.

One object of the present invention is to define a software set-top box (STB) capable of processing various charged services including a charged broadcasting service used to be provided by a legacy physical STB and provide a service system for processing a charged service via the software STB, a digital device, and a method of processing the charged broadcasting service.

Another object of the present invention is to provide a method of approaching, configuring, and processing a charged service in a digital device via the software STB.

The other object of the present invention is to enable a user to enjoy more various charged services in a digital device via a plurality of software STBs.

Technical objects obtainable from the present invention are non-limited the above-mentioned technical object. And, other unmentioned technical objects can be clearly understood from the following description by those having ordinary skill in the technical field to which the present invention pertains.

Various embodiment(s) for a service system, a digital device, and a method of processing a service therefor are disclosed in the present specification.

According to one embodiment of the present invention, a method of processing a service in the digital device includes the steps of downloading and installing one or more STB applications configured to process the service, outputting an icon configured to approach the installed STB applications on a first service board supporting an RF mode, receiving a selection of an STB application icon among the STB applications, and outputting content processed by the selected STB application according to a result of a service authentication and a second service board for the selected STB application.

According to one embodiment of the present invention, a digital device processing a service includes an output unit configured to output an icon used for approaching installed STB applications on a first service board supporting an RF mode, a user interface unit configured to receive a selection of an STB application icon among the STB applications, and a control unit configured to control one or more STB applications used for processing the service to be downloaded and installed, the control unit configured to control content processed by the selected STB application to be outputted according to a result of a service authentication, the control unit configured to control a second service board for the selected STB application to be outputted. Technical solutions obtainable from the present invention are non-limited the above mentioned technical solutions. And, other unmentioned technical solutions can be clearly understood from the following description by those having ordinary skill in the technical field to which the present invention pertains.

According to the present invention,

First of all, it is able to define a software STB of a new form capable of processing various charged services including a charged broadcasting service used to be provided by a legacy physical STB and provide a service system for processing a charged service via the software STB, a digital device, and a method of processing the charged broadcasting service.

Secondly, it is able to provide a method of approaching, configuring, and processing a charged service in a digital device via the software STB.

Thirdly, it is able to enable a user to enjoy more various charged services in a digital device via a plurality of software STBs.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 is a diagram for explaining a process of installing an STB application in a digital device according to one embodiment of the present invention;

FIG. 9 is a diagram for explaining a home screen UI of an IPTV supporting mode according to one embodiment of the present invention;

FIG. 13 is a diagram for explaining a method of approaching a live recent list in the course of watching a live content of an IPTV supporting mode according to one embodiment of the present invention;

FIG. 22 is a diagram for explaining a method of processing multi charged services according to the present invention;

FIG. 28 and FIG. 29 are diagrams for explaining a hybrid EPG configured according to one embodiment of the present invention.

DETAILED DESCRIPTION OF THE INVENTION

Figure 1:
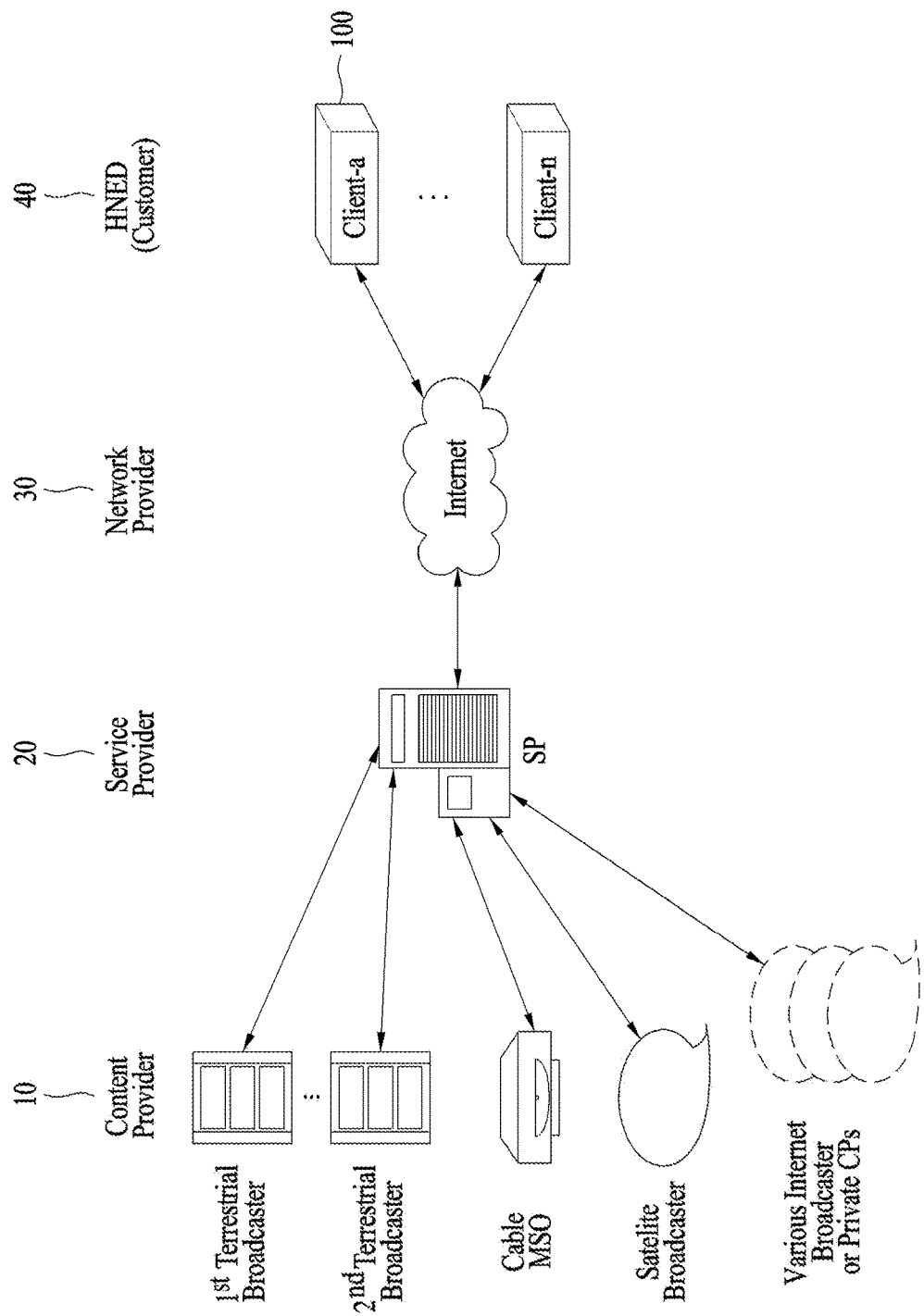
FIG. 1 is a schematic diagram for an example of a service system including a digital device.

In the following description, various embodiments according to the present invention are explained with reference to attached drawings.

As mentioned in the foregoing description, a digital device processes a charged service including a broadcasting service based on a software set-top box (STB) instead of a physical STB in the present specification. Meanwhile, the charged broadcasting service can be processed by the physical STB as well.

In the foregoing description, the physical STB is a hardware concept and may mean a module configured to process a broadcasting signal including a service transmitted in a radio frequency (RF) mode. The physical STB may also be embedded or connected with a digital device to perform a conventionally provided service as well as a charged service processed by the software STB in an external input mode instead of the RF mode according to the present invention.

In the foregoing description, the charged service includes not only a charged broadcasting service but also various charged services provided by a service provider. For instance, the charged service may include a charged game service, a charged video on demand (VOD) service, a charged movie service, a charged electronic program service (EPG) service, a charged music service, a charged chatting service, and the like as well as the aforementioned charged broadcasting service. Yet, for clarity, the present specification explains the charged broadcasting service as one embodiment, by which the present specification may be non-limited.

In the foregoing description, the software STB can be defined in various forms. Yet, for clarity of explanation, the software STB is defined as an application form (hereinafter called STB application) and is explained based on the STB application. Although the STB application is defined by an application form, the STB application includes a function of the physical STB processing various functions and contents whereas a conventional application processes a specific function or content in general. Meanwhile, one STB application can be connected with one service provider or a plurality of service providers. On the contrary, one service provider may enable one or more charged services capable of being provided by the service provider to be processed by one STB application only and may also use a plurality of STB applications.

Meanwhile, as mentioned in the foregoing description, a digital device according to the present invention can include such a mobile device as a smartphone, a tablet PC, a lap-top, a wearable device, and the like as well as such a fixed device as a smart TV providing a charged broadcasting service, a PC, and the like. As mentioned in the foregoing description, a broadcasting service was mainly able to be provided by a TV only in the past except a digital multimedia broadcasting (DMB). Yet, according to the present invention, any digital device in which the STB application is installed can process and provide a broadcasting service like a legacy TV does. For clarity, the digital device is explained with a smart TV in the following description as one embodiment.

In the following description, a digital device configured to process a charged broadcasting service based on the STB application according to the present invention is explained in more detail with reference to the attached drawing.

FIG. 1 illustrates a broadcast system including a digital receiver according to an embodiment of the present invention.

Referring to FIG. 1, examples of a broadcast system comprising a digital receiver may include a content provider (CP) 10, a service provider (SP) 20, a network provider (NP) 30, and a home network end user (HNED) (Customer) 40. The HNED 40 includes a client 100, that is, a digital receiver.

Each of the CP 10, SP 20 and NP 30, or a combination thereof may be referred to as a server. The HNED 40 can also function as a server. The term 'server' means an entity that transmits data to another entity in a digital broadcast environment. Considering a server-client concept, the server can be regarded as an absolute concept and a relative concept. For example, one entity can be a server in a relationship with a first entity and can be a client in a relationship with a second entity.

The CP 10 is an entity that produces content. Referring to FIG. 1, the CP 10 can include a $1^{st}$ or $2^{nd}$ terrestrial broadcaster, a cable system operator (SO), a multiple system operator (MSO), a satellite broadcaster, various Internet broadcasters, private content providers (CPs), etc. The content can include applications as well as broadcast content.

The SP 20 packetizes content provided by the CP 10. Referring to FIG. 1, the SP 20 packetizes content provided by the CP 10 into one or more services available for users.

The SP 20 can provide services to the client 100 in a uni-cast or multi-cast manner.

The CP 10 and the SP 20 can be configured in the form of one entity. For example, the CP 10 can function as the SP 20 by producing content and directly packetizing the produced content into services, and vice versa.

The NP 30 can provide a network environment for data exchange between the server 10 and/or 20 and the client 100. The NP 30 supports wired/wireless communication protocols and constructs environments therefor. In addition, the NP 30 can provide a cloud environment.

The client 100 can construct a home network and transmit/receive data.

The server can use and request a content protection means such as conditional access. In this case, the client 100 can use a means such as a cable card or downloadable CAS (DCAS), which corresponds to the content protection means of the server.

In addition, the client 100 can use an interactive service through a network. In this case, the client 100 can directly serve as the CP 10 and/or the SP 20 in a relationship with another client or indirectly function as a server of the other client.

Figure 2:
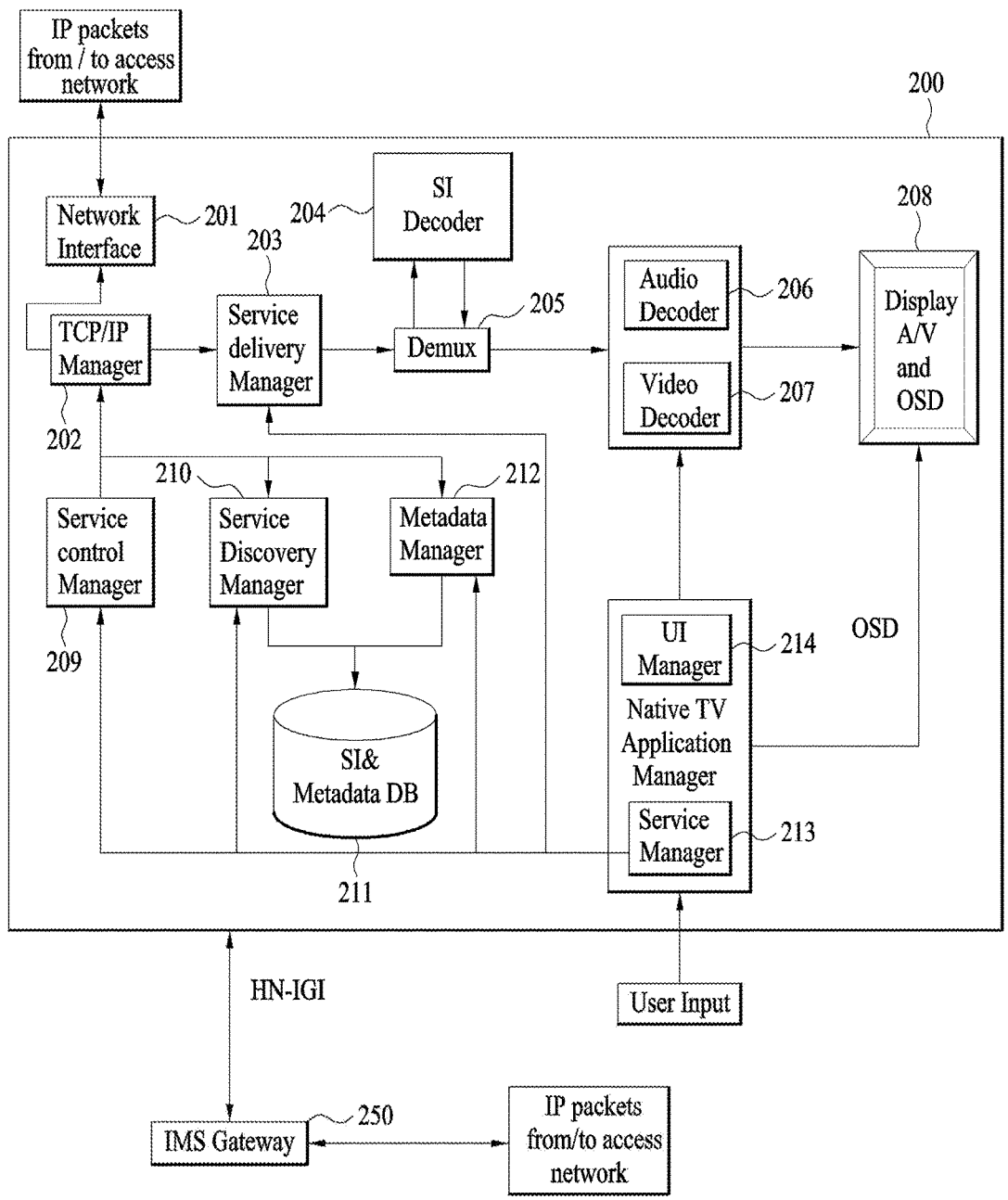
FIG. 2 is a block diagram for explaining one embodiment of a digital device.

FIG. 2 is a schematic diagram of a digital receiver 200 according to an embodiment of the present invention. The digital receiver 200 may correspond to the client 100 shown in FIG. 1.

A digital receiver according to an embodiment of the present invention may include a receiving unit configured to receive a signal containing at least one service, a decoder configured to decode the received service, a controller configured to control activated data corresponding to a predetermined area or data to be output by performing a first process when the predetermined area or data is selected from a screen and to control a specific mode to be executed as a second process when the activated data accesses a boundary region of the screen, and a display unit configured to display the decoded service, the activated data under the control of the controller, and a resultant of the executed specific mode on the screen. The specific mode can include a tray including a collection of the activated data to a first region from a spare region generated by controlling the size and resolution of the full screen configured prior to the first process.

The controller can control one or more search engines for the specific mode to be output to a second region from the spare region, control a quick search icon configured with a combination of predetermined data included in the tray and a predetermined search engine selected from the search engines to be output to a third region from the spare region, control a result obtained by searching the corresponding tray data through the corresponding search engine to be displayed on the screen when the quick search icon is accessed, and determine whether the activated data accesses the boundary of the screen on the basis of coordinate information about screen configuration.

In addition, the controller can control at least one of the activated data and tray data to be configured using at least one of text data, audio data, video data, and image data. If at least one of the activated data and tray data correspond to image data, the controller can control the image data to be configured in at least one of BMP, JPG, JPEG, and PNG formats.

A digital receiver according to another embodiment of the present invention may include a receiving unit configured to receive a signal containing at least one service, a decoder configured to decode the received service, a controller configured to control a first process to be performed to configure and output activated data corresponding to a first region when the first region is selected from a screen providing at least one service and to control a specific function to be executed on the basis of coordinate information of a second region as a second process when the output activated data is located in the second region, and a display unit configured to display the decoded service and a result of the second process under the control of the controller on a third region of a screen.

The controller can recognize at least one of text data, image data and object data as the first region according to corresponding service and recognize at least one of a web browser, App store, My App, Media, and tray function as the specific function.

The controller can control the activated data image to be included in a header of actual text string information.

A smart TV is exemplified as the digital receiver 200 in the following description in order to help understanding of the present invention and improve convenience of description. Here, the smart TV can provide an additional service such as SNS.

The digital receiver 200 may include a network interface 201, a TCP/IP manager 202, a service delivery manager 203, an SI (System Information, Service Information or Signaling Information) decoder 204, a demultiplexer 205, an audio decoder 206, a video decoder 207, a display A/V and OSD (On Screen Display) module 208, a service control manager 209, a service discovery manager 210, a SI & metadata database (DB) 211, a metadata manager 212, an application manager, etc.

The network interface 201 may receive or transmit IP packets including service data through a network. In other words, the network interface 201 may receive IP packets including at least one of text data, image data, audio data, and video data, used for SNS, as well as services and applications from a server connected thereto through a network.

The TCP/IP manager 202 may involve delivery of IP packets transmitted to the digital receiver 200 and IP packets transmitted from the digital receiver 200, that is, packet delivery between a source and a destination. The TCP/IP manager 202 may classify received packets according to an appropriate protocol and output the classified packets to the service delivery manager 205, the service discovery manager 210, the service control manager 209, and the metadata manager 212.

The service delivery manager 203 may control classification and processing of service data. The service delivery manager 203 may control real-time streaming data, for example, using real-time protocol/real-time control protocol (RTP/RTCP). In other words, the service delivery manager 203 may parse a real-time streaming data packet, transmitted on the basis of the RTP, according to the RTP and transmits the parsed data packet to the demultiplexer 205 or store the parsed data packet in the SI & metadata DB 211 under the control of the service manager 213. The service delivery manager 203 can feed back network reception information to the server on the basis of the RTP.

The demultiplexer 205 may demultiplex audio data, video data, SI from a received packet through packet identifier (PID) filtering and transmit the demultiplexed data to corresponding processors, that is, the audio/video decoder 206/207 and the SI decoder 204.

The SI decoder 204 may parse and/or decode SI data such as program specific information (PSI), program and system information protocol (PSIP), digital video broadcast-service information (DVB-SI), etc.

The SI decoder 204 may store the parsed and/or decoded SI data in the SI & metadata DB 211. The SI data stored in the SI & metadata DB 211 can be read or extracted and used by a component which requires the SI data. EPG data can also be read from the SI & metadata DB 211. This will be described below in detail.

The audio decoder 206 and the video decoder 207 respectively may decode audio data and video data, which are demultiplexed by the demultiplexer 205. The decoded audio data and video data may be provided to the user through the display unit 208.

The application manager may include a service manager 213 and a user interface (UI) manager 214, administrate the overall state of the digital receiver 200, provides a UI, and manage other mangers.

The UI manager 214 can receive a key input from the user and provide a graphical user interface (GUI) related to a receiver operation corresponding to the key input through OSD.

The service manager 213 may control and manage service-related managers such as the service delivery manager 203, the service discovery manager 210, the service control manager 209, and the metadata manager 212.

The service manager 213 may configure a channel map and enable channel control at the request of the user on the basis of the channel map.

The service manager 213 may receive service information corresponding to channel from the SI decoder 204 and set audio/video PID of a selected channel to the demultiplexer 205 so as to control the demultiplexing procedure of the demultiplexer 205.

The application manager can configure an OSD image or control configuration of the OSD image to provide a window for SNS on a predetermined region of the screen when the user requests SNS. The application manager can configure the OSD image or control the configuration of OSD image such that the SNS window can be determined and provided at the request of the user in consideration of other services, for example, a broadcast service. In other words, when the digital receiver 200 may provide a service (for example, SNS) through an image on the screen, the digital receiver 200 may configure the image such that it can appropriately cope with requests in consideration of relationship with other services, priority, etc.

The application manager can receive data for SNS from a related external server such as an SNS providing server or a manufacturer-provided server and store the received data in a memory such that the data is used to configure OSD for providing SNS at the request of the user and SNS may be provided through a predetermined area of the screen. Furthermore, the digital receiver 200 can store data, related with a service and input by the user during the service, in the memory in a similar manner such that the data is used to configure the service and, if required, process the data into a form required for another digital receiver and transmit the processed data to the other digital receiver or a related service server.

In addition, the application manager, the controller or the digital receiver can control information or an action corresponding to a request of the user to be executed when the user makes the request while using the SNS. For example, when the user selects input data of another user or a region corresponding to the input data while using the SNS, the application manager, the controller or the digital receiver may control the first process and/or the second process for handling the selected data or region to be performed and control the first result and/or the second result to be output in an appropriate form. The first result and/or the second result can include information, an action, a related UI, etc. and be configured in various forms such as text, an image, audio/video data, etc. The first result and/or the second result can be manually or automatically provided and performed by the digital receiver.

When the user moves the first result (e.g. image data) to a broadcast program or broadcast service output area through drag & drop, the digital receiver can perform the second process (e.g., search process) on data relating to the first result using an electronic program guide (EPG) or electronic service guide (ESG) (referred to as 'broadcast guide' hereinafter) (i.e., a search engine) to provide a second result. Here, the second result can be provided in a form similar to the broadcast guide used as a search engine or provided as a separately configured UI. When the second result is provided in the form of the broadcast guide, other data can be provided with the second result. In this case, the second result can be configured such that it is distinguished from other data so as to allow the user to easily recognize the second data. To discriminate the second result from other data, the second result can be highlighted, hatched, and provided in 3-dimensional (3D) form.

In the execution of the second process, the digital receiver can automatically determine the type of the second process and whether or not to perform the second process on the basis of a position variation of the first result. In this case, coordinate information of the screen can be used for determining whether the position of the first result is changed or for information on a changed position between the second process and the first result. For example, when a service and/or OSD may be displayed on the screen, the digital receiver can determine and store coordinate information about the displayed service and/or OSD. Accordingly, the digital receiver can be aware of coordinate information about a service and data being provided to the screen in advance and thus can recognize a variation in the position (information) of the first result on the basis of the coordinate information and perform the second process based on the position of the first result.

The service discovery manager 210 may provide information required to select a service provider that provides a service. Upon receipt of a signal for selecting a channel from the service manager 213, the service discovery manager 210 discovers a service on the basis of the received signal.

The service control manager 209 may select and control a service. For example, the service control manager 209 may perform service selection and control using IGMP (Internet Group Management Protocol) or real time streaming protocol (RTSP) when the user selects a live broadcast service and using RTSP when the user selects a video on demand (VOD) service.

The schemes or protocols described in the specification are exemplified in order to aid in understanding of the present invention for convenience of explanations and the scope of the present invention is not limited thereto. Accordingly, the schemes or protocols can be determined in consideration of conditions different from the exemplified ones and other schemes or protocols can be used.

The metadata manager 212 may manage metadata regarding services and store metadata in the SI & metadata DB 211.

The SI & metadata DB 211 may store SI data decoded by the SI decoder 204, metadata managed by the metadata manager 212, and information required to select a service provider, which is provided by the service discovery manager 210. In addition, the SI & metadata DB 211 can store system set-up data.

An IMS (IP Multimedia Subsystem) gateway 250 may include functions required to access an IMS based IPTV services.

Figure 3:
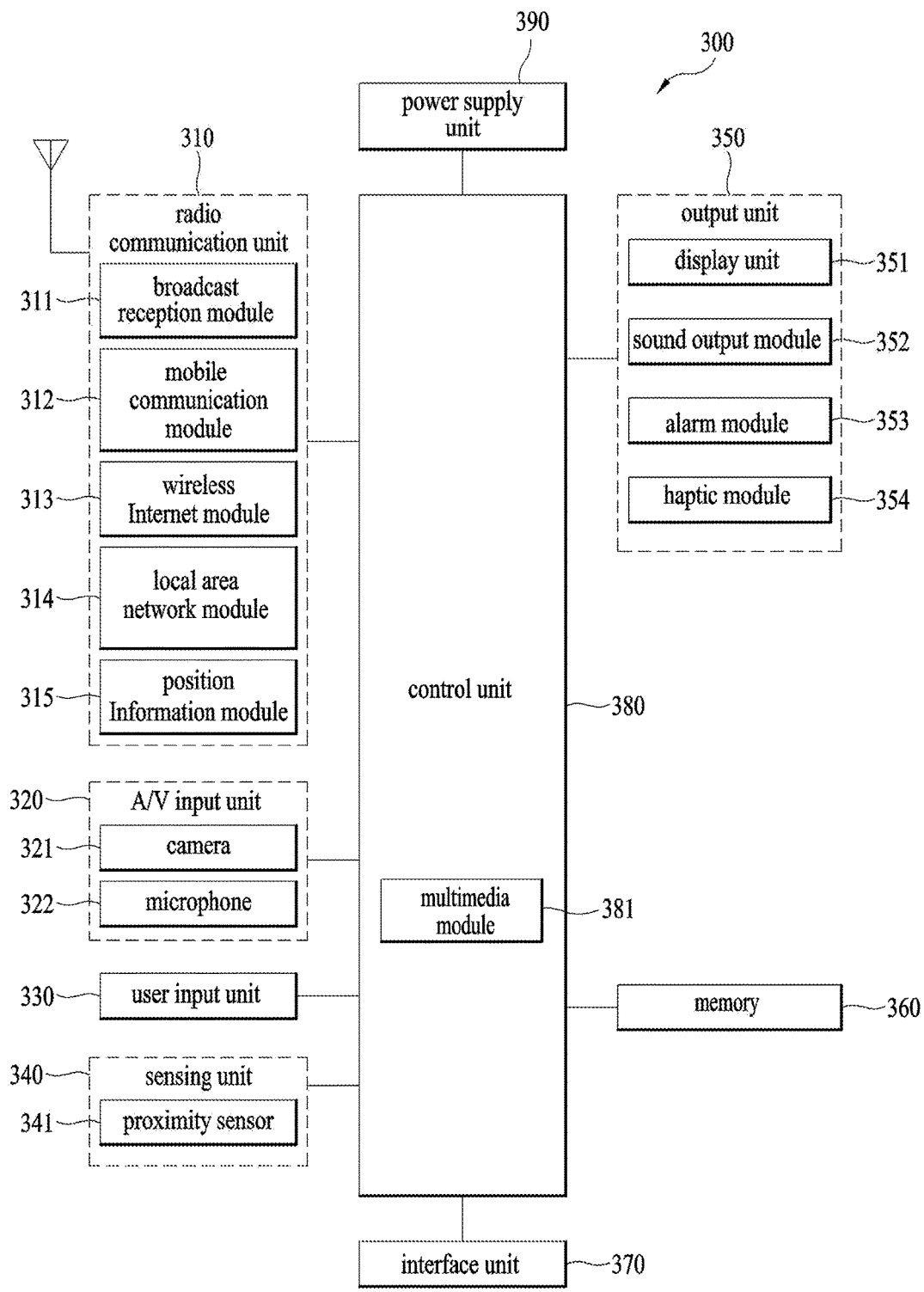
FIG. 3 is a block diagram for explaining a different embodiment of a digital device.

FIG. 3 is a block diagram of a mobile terminal 300 in accordance with an embodiment of the present invention. With reference to FIG. 3, the mobile terminal 300 includes a wireless communication unit 310, an A/V (audio/video) input unit 320, an user input unit 330, a sensing unit 340, an output unit 350, a memory 360, an interface unit 370, a controller 380, and a power supply unit 390. FIG. 3 shows the mobile terminal 300 having various components, but it is understood that implementing all of the illustrated components is not a requirement. More or fewer components may be implemented according to various embodiments.

The wireless communication unit 310 typically includes one or more components which permit wireless communication between the mobile terminal 300 and a wireless communication system or network within which the mobile terminal 300 is located. For instance, the wireless communication unit 310 can include a broadcast receiving module 311, a mobile communication module 312, a wireless Internet module 313, a short-range communication module 314, and a position-location module 315.

The broadcast receiving module 311 receives a broadcast signal and/or broadcast associated information from an external broadcast managing server via a broadcast channel. The broadcast channel may include a satellite channel and a terrestrial channel. At least two broadcast receiving modules 311 can be provided in the mobile terminal 300 to facilitate simultaneous reception of at least two broadcast channels or broadcast channel switching.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this case, the broadcast associated information can be received by the mobile communication module 312.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 311 may be configured to receive broadcast signals transmitted from various types of broadcast systems. By non-limiting example, such broadcasting systems may include digital multimedia broadcasting-terrestrial (DMB-T), digital multimedia broadcasting-satellite (DMB-S), digital video broadcast-handheld (DVB-H), digital video broadcast-convergence of broadcasting and mobile services (DVB-CBMS), Open Mobile Alliance Broadcast (OMA-BCAST), the data broadcasting system known as media forward link only (MediaFLO®) and integrated services digital broadcast-terrestrial (ISDB-T). Optionally, the broadcast receiving module 311 can be configured to be suitable for other broadcasting systems as well as the above-noted digital broadcasting systems.

The broadcast signal and/or broadcast associated information received by the broadcast receiving module 311 may be stored in a suitable device, such as the memory 360.

The mobile communication module 312 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals may carry audio, video, and data according to text/multimedia messages.

The wireless Internet module 313 supports Internet access for the mobile terminal 300. This module may be internally or externally coupled to the mobile terminal 300. The wireless Internet technology can include WLAN (Wireless LAN), Wi-Fi, Wibro™ (Wireless broadband), Wimax™ (World Interoperability for Microwave Access), HSDPA (High Speed Downlink Packet Access), GSM, CDMA, WCDMA, or LTE (Long Term Evolution).

Wireless Internet access by Wibro™, HSPDA, GSM, CDMA, WCDMA, or LTE is achieved via a mobile communication network. In this regard, the wireless Internet module 313 may be considered as being a kind of the mobile communication module 312 to perform the wireless Internet access via the mobile communication network.

The short-range communication module 314 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™, to name a few.

The position-location module 315 identifies or otherwise obtains the location of the mobile terminal 100. According to one embodiment, this module may be implemented with a global positioning system (GPS) module. The GPS module 315 is able to precisely calculate current 3-dimensional position information based on at least longitude, latitude or altitude and direction (or orientation) by calculating distance information and precise time information from at least three satellites and then applying triangulation to the calculated information. Location information and time information are calculated using three satellites, and errors of the calculated location position and one or more time information are then amended (or corrected) using another satellite. In addition, the GPS module 315 is able to calculate speed information by continuously calculating a real-time current location.

With continued reference to FIG. 3, the audio/video (A/V) input unit 320 is configured to provide audio or video signal input to the mobile terminal 300. As shown, the A/V input unit 320 includes a camera 321 and a microphone 322. The camera 321 receives and processes image frames of still pictures or video, which are obtained by an image sensor in a video call mode or a photographing mode. Furthermore, the processed image frames can be displayed on the display 351.

The image frames processed by the camera 321 can be stored in the memory 360 or can be transmitted to an external recipient via the wireless communication unit 310. Optionally, at least two cameras 321 can be provided in the mobile terminal 300 according to the environment of usage.

The microphone 322 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 312 in a call mode. The microphone 322 typically includes assorted noise removing algorithms to remove noise generated in the course of receiving the external audio signal.

The user input unit 330 generates input data responsive to user manipulation of an associated input device or devices. Examples of such devices include a keypad, a dome switch, a touchpad (e.g., static pressure/capacitance), a jog wheel, and a jog switch.

The sensing unit 340 provides sensing signals for controlling operations of the mobile terminal 300 using status measurements of various aspects of the mobile terminal. For instance, the sensing unit 340 may detect an open/closed status of the mobile terminal 100, the relative positioning of components (e.g., a display and keypad) of the mobile terminal 300, a change of position (or location) of the mobile terminal 300 or a component of the mobile terminal 300, a presence or absence of user contact with the mobile terminal 300, and an orientation or acceleration/deceleration of the mobile terminal 300. As an example, a mobile terminal 300 configured as a slide-type mobile terminal is considered. In this configuration, the sensing unit 340 may sense whether a sliding portion of the mobile terminal is open or closed. According to other examples, the sensing unit 340 senses the presence or absence of power provided by the power supply unit 390, and the presence or absence of a coupling or other connection between the interface unit 370 and an external device. According to one embodiment, the sensing unit 340 can include a proximity sensor 341.

The output unit 350 generates output relevant to the senses of sight, hearing, and touch. Furthermore, the output unit 350 includes the display 351, an audio output module 352, an alarm unit 353, a haptic module 354, and a projector module 355.

The display 351 is typically implemented to visually display (output) information associated with the mobile terminal 300. For instance, if the mobile terminal is operating in a phone call mode, the display will generally provide a user interface (UI) or graphical user interface (GUI) which includes information associated with placing, conducting, and terminating a phone call. As another example, if the mobile terminal 300 is in a video call mode or a photographing mode, the display 351 may additionally or alternatively display images which are associated with these modes, the UI or the GUI.

The display module 351 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 300 may include one or more of such displays.

Some of the displays can be implemented in a transparent or optical transmittive type, i.e., a transparent display. A representative example of the transparent display is the TOLED (transparent OLED). A rear configuration of the display 351 can be implemented as the optical transmittive type as well. In this configuration, a user may be able to see an object located at the rear of a terminal body on a portion of the display 351 of the terminal body.

At least two displays 351 can be provided in the mobile terminal 300 in accordance with one embodiment of the mobile terminal 300. For instance, a plurality of displays can be arranged to be spaced apart from each other or to form a single body on a single face of the mobile terminal 300. Alternatively, a plurality of displays can be arranged on different faces of the mobile terminal 300.

If the display 351 and a sensor for detecting a touch action (hereinafter called 'touch sensor') are configured as a mutual layer structure (hereinafter called 'touch screen'), the display 351 is usable as an input device as well as an output device. In this case, the touch sensor can be configured as a touch film, a touch sheet, or a touchpad.

The touch sensor can be configured to convert pressure applied to a specific portion of the display 351 or a variation of capacitance generated from a specific portion of the display 351 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 380. Therefore, the controller 380 is made aware when a prescribed portion of the display 351 is touched.

Referring to FIG. 3, a proximity sensor 341 can be provided at an internal area of the mobile terminal 300 enclosed by the touch screen or around the touch screen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 341 is more durable than a contact type sensor and also has utility broader than the contact type sensor.

The proximity sensor 341 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touch screen includes the electrostatic capacity proximity sensor, it is configured to detect the proximity of a pointer using a variation of an electric field according to the proximity of the pointer. In this configuration, the touch screen (touch sensor) can be considered as the proximity sensor.

For clarity and convenience of explanation, an action for enabling the pointer approaching the touch screen to be recognized as placed on the touch screen may be named 'proximity touch' and an action of enabling the pointer to actually come into contact with the touch screen may named 'contact touch'. And, a position, at which the proximity touch is made to the touch screen using the pointer, may mean a position of the pointer vertically corresponding to the touch screen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touch screen.

The audio output module 352 functions in various modes including a call-receiving mode, a call-placing mode, a recording mode, a voice recognition mode, and a broadcast reception mode to output audio data which is received from the wireless communication unit 310 or is stored in the memory 360. During operation, the audio output module 352 outputs audio relating to a particular function (e.g., call received, message received). The audio output module 352 may be implemented using one or more speakers, buzzers, other audio producing devices, and combinations of these devices.

The alarm unit 353 outputs a signal for announcing the occurrence of a particular event associated with the mobile terminal 300. Typical events include a call received, a message received and a touch input received. The alarm unit 353 is able to output a signal for announcing the event occurrence by way of vibration as well as video or audio signal. The video or audio signal can be output via the display 351 or the audio output module 352. Hence, the display 351 or the audio output module 352 can be regarded as a part of the alarm unit 353.

The haptic module 354 generates various tactile effects that can be sensed by a user. Vibration is a representative one of the tactile effects generated by the haptic module 354. The strength and pattern of the vibration generated by the haptic module 354 are controllable. For instance, different vibrations can be output in a manner of being synthesized together or can be output in sequence.

The haptic module 354 is able to generate various tactile effects as well as the vibration. For instance, the haptic module 354 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device.

The haptic module 354 can be implemented to enable a user to sense the tactile effect through a muscle sense of a finger or an arm as well as to transfer the tactile effect through direct contact. Optionally, at least two haptic modules 354 can be provided in the mobile terminal 300 in accordance with an embodiment of the mobile terminal 300.

The memory 360 is generally used to store various types of data to support the processing, control, and storage requirements of the mobile terminal 300. Examples of such data include program instructions for applications operating on the mobile terminal 300, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 360.

Moreover, data for various patterns of vibration and/or sound output in response to a touch input to the touch screen can be stored in the memory 360.

The memory 360 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 300 is able to operate in association with a web storage for performing a storage function of the memory 360 on the Internet.

The interface unit 370 may be implemented to couple the mobile terminal 100 with external devices. The interface unit 370 receives data from the external devices or is supplied with power and then transfers the data or power to the respective elements of the mobile terminal 300 or enables data within the mobile terminal 300 to be transferred to the external devices. The interface unit 370 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 300 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectible to the mobile terminal 300 via the corresponding port.

When the mobile terminal 300 is connected to an external cradle, the interface unit 370 becomes a passage for supplying the mobile terminal 300 with a power from the cradle or a passage for delivering various command signals input from the cradle by a user to the mobile terminal 300. Each of the various command signals input from the cradle or the power can operate as a signal enabling the mobile terminal 300 to recognize that it is correctly loaded in the cradle.

The controller 380 typically controls the overall operations of the mobile terminal 300. For example, the controller 380 performs the control and processing associated with voice calls, data communications, and video calls. The controller 380 may include a multimedia module 381 that provides multimedia playback. The multimedia module 381 may be configured as part of the controller 380, or implemented as a separate component.

Moreover, the controller 380 is able to perform a pattern (or image) recognizing process for recognizing a writing input and a picture drawing input carried out on the touch screen as characters or images, respectively.

The power supply unit 390 provides power required by various components of the mobile terminal 300. The power may be internal power, external power, or combinations of internal and external power.

Various embodiments described herein may be implemented in a computer-readable medium using, for example, computer software, hardware, or some combination of computer software and hardware. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 160, and executed by a controller or processor, such as the controller 380.

Figure 4:
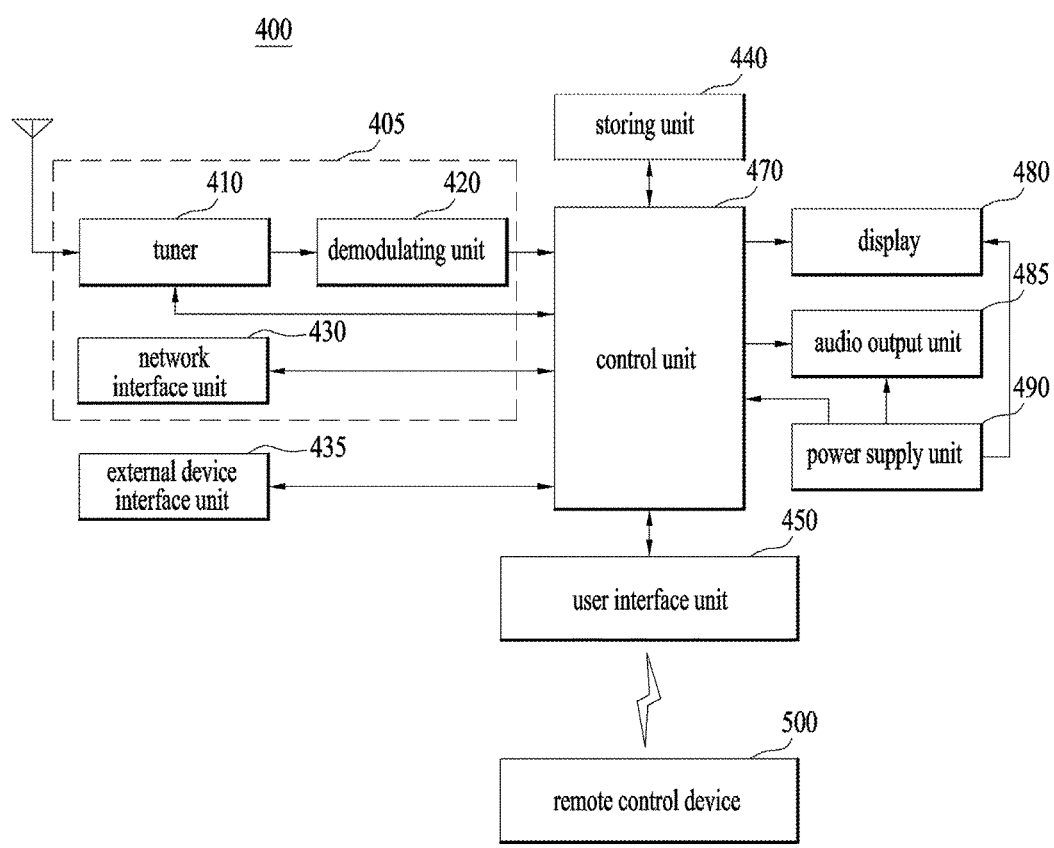
FIG. 4 is a block diagram for explaining a further different embodiment of a digital device.

FIG. 4 illustrates a digital receiver according to another embodiment of the present invention.

Referring to FIG. 4, an exemplary digital receiver 400 according to the present invention may include a broadcast receiving unit 405, an external device interface 435, a storage unit 440, a user input interface 450, a controller 470, a display unit 480, an audio output unit 485, a power supply unit 490, and a photographing unit (not shown). The broadcast receiving unit 305 may include at least one of one or more tuner 410, a demodulator 420, and a network interface 430. The broadcast receiving unit 405 may include the tuner 410 and the demodulator 420 without the network interface 430, or may include the network interface 430 without the tuner 410 and the demodulator 420. The broadcast receiving unit 405 may include a multiplexer (not shown) to multiplex a signal, which is subjected to the tuner 410 and demodulated by the demodulator 420, and a signal received through the network interface 40. In addition, the broadcast receiving unit 405 can include a demultiplexer (not shown) and demultiplex a multiplexed signal, a demodulated signal, or a signal received through the network interface 430.

The tuner 410 may receive a radio frequency (RF) broadcast signal by tuning to a channel selected by the user from among RF broadcast signals received through an antenna or all previously stored channels.

The demodulator 420 may receive a digital IF (Intermediate Frequency) signal (DIF) converted by the tuner 410 and demodulate the DIF signal.

A stream signal output from the demodulator 420 may be input to the controller 470. The controller 470 can control demultiplexing, audio/video signal processing, etc. Furthermore, the controller 470 can control output of an image through the display unit 480 and output of audio through the audio output unit 485.

The external device interface 435 may provide an environment for interfacing external devices with the digital receiver 400. To implement this, the external device interface 435 may include an A/V input/output unit (not shown) or an RF communication unit (not shown).

The external device interface 435 can be connected with external devices such as a digital versatile disk (DVD), a Blu-ray player, a game device, a camera, a camcorder, a computer (notebook computer), a Cloud and a mobile device (e.g., a Smart Phone, a tablet PC, and the like) in a wired/wireless manner.

The A/V input/output unit may include a USB (Universal Serial Bus) terminal, a composite video banking sync (CVBS) terminal, a component terminal, an S-video terminal (analog), a digital visual interface (DVI) terminal, a high definition multimedia interface (HDMI) terminal, an RGB terminal, a D-SUB terminal, etc.

The RF communication unit can perform near field communication. The digital receiver 400 can be networked with other electronic apparatuses according to communication protocols such as Bluetooth, radio frequency identification (RFID), infrared data association (IrDA), ultra wideband (UWB), ZigBee, and digital living network alliance (DLNA), for example.

The network interface 430 may provide an interface for connecting the digital receiver 400 to wired/wireless networks.

Using the network interface 430, the digital receiver can transmit/receive data to/from other users or other electronic apparatuses or access a predetermined web page through a network connected thereto or another network linked to the connected network.

The network interface 430 can selectively receive a desired application from among publicly open applications through a network.

The storage unit 440 may store programs for signal processing and control and store a processed video, audio or data signal.

In addition, the storage unit 440 may execute a function of temporarily storing a video, audio or data signal input from the external device interface 435 or the network interface 430. The storage unit 440 may store information about a predetermined broadcast channel through a channel memory function.

The storage unit 440 can store an application or a list of applications input from the external device interface 435 or the network interface 430. The storage unit 440 may store various platforms which will be described later. The storage unit 440 can include storage media of one or more types, such as a flash memory type, a hard disk type, a multimedia card micro type, a card type memory (e.g. SD or XD memory), RAM, EEPROM, etc. The digital receiver 400 may reproduce content files (a video file, a still image file, a music file, a text file, an application file, etc.) and provide them to the user.

While FIG. 4 illustrates an embodiment in which the storage unit 440 is separated from the controller 470, the configuration of the digital receiver 400 is not limited thereto and the storage unit 440 may be included in the controller 470.

The user input interface 450 may transmit a signal input by the user to the controller 470 or deliver a signal output from the controller 470 to the user.

For example, the user input interface 450 can receive control signals such as a power on/off signal, a channel selection signal, an image setting signal, etc. from the remote controller 500 or transmit control signals of the controller 470 to the remote controller 500 according to various communication schemes such as RF communication, IR communication, and the like.

The user input interface 450 can transmit control signals input through a power key, a channel key, a volume key, and a local key (not shown) of a set value to the controller 470.

The user input interface 450 can transmit a control signal input from a sensing unit (not shown) which senses a gesture of the user or deliver a signal of the controller 470 to the sensing unit (not shown). Here, the sensing unit (not shown) may include a touch sensor, a voice sensor, a position sensor, an action sensor, an acceleration sensor, a gyro sensor, a speed sensor, a tilt sensor, a temperature sensor, a pressure or back-pressure sensor, etc.

The controller 470 can generate and output a signal for video or audio output by demultiplexing streams input through the tuner 410, the demodulator 420 or the external device interface 435 or processing demultiplexed signals.

A video signal processed by the controller 470 can be input to the display unit 380 and displayed as an image through the display unit 480. In addition, the video signal processed by the controller 470 can be input to an external output device through the external device interface 435.

An audio signal processed by the controller 470 can be applied to the audio output unit 485. Otherwise, the audio signal processed by the controller 470 can be applied to an external output device through the external device interface 435.

The controller 470 may include a demultiplexer and an image processor, which are not shown in FIG. 4.

The controller 470 can control the overall operation of the digital receiver 300. For example, the controller 470 can control the tuner 410 to tune to an RF broadcast corresponding to a channel selected by the user or a previously stored channel.

The controller 470 can control the digital receiver 400 according to a user command input through the user input interface 450 or an internal program. Particularly, the controller 470 can control the digital receiver 400 to be linked to a network to download an application or application list that the user desires to the digital receiver 400.

For example, the controller 470 may control the tuner 410 to receive a signal of a channel selected in response to a predetermined channel selection command received through the user input interface 450. In addition, the controller 470 may process a video, audio or data signal corresponding to the selected channel. The controller 470 may control information on a channel selected by the user to be output with a processed video or audio signal through the display unit 480 or the audio output unit 485.

Alternatively, the controller 470 may control a video signal or an audio signal received from an external apparatus, for example, a camera or a camcorder through the external device interface 435 to be output through the display unit 480 or the audio output unit 485 according to an external device image reproduction command received through the user input interface 450.

The controller 470 can control the display unit 480 to display images. For example, the controller 470 can control a broadcast image input through the tuner 410, an external input image received through the external device interface 435, an image input through the network interface 430, or an image stored in the storage unit 440 to be displayed on the display unit 480. Here, an image displayed on the display unit 480 can be a still image or video, and it can be a 2D or 3D image.

The controller 470 can control reproduction of content. Here, the content may be content stored in the digital receiver 400, received broadcast content, or content input from an external device. The content may include at least one of a broadcast image, an external input image, an audio file, a still image, an image of a linked web, and a text file.

The controller 470 can control display of applications or an application list, downloadable from the digital receiver 400 or an external network, when an application view menu is selected.

The controller 470 can control installation and execution of applications downloaded from an external network in addition to various user interfaces. Furthermore, the controller 470 can control an image relating to an application executed by user selection to be displayed on the display unit 480.

The digital receiver 400 may further include a channel browsing processor (not shown) which generates a thumbnail image corresponding to a channel signal or an external input signal.

The channel browsing processor can receive a stream signal (e.g., TS) output from the demodulator 420 or a stream signal output from the external device interface 435 and extract an image from the received stream signal to generate a thumbnail image. The generated thumbnail image can be directly input to the controller 470 or can be encoded and then input to the controller 470. Also, the thumbnail image can be coded into a stream and then applied to the controller 470. The controller 470 can display a thumbnail list including a plurality of thumbnail images on the display unit 480 using thumbnail images input thereto. The thumbnail images included in the thumbnail list can be updated sequentially or simultaneously. Accordingly, the user can conveniently check content of a plurality of broadcast channels.

The display unit 480 may convert a video signal, a data signal, and an OSD signal processed by the controller 470 and a video signal and a data signal received from the external device interface 435 into RGB signals to generate driving signals. The display unit 480 may be a PDP, an LCD, an OLED, a flexible display, a 3D display or the like. The display unit 480 may be configured as a touch-screen and used as an input device rather than an output device. The audio output unit 485 receives a signal audio-processed by the controller 470, for example, a stereo signal, a 3.1 channel signal or a 5.1 channel signal, and outputs the received signal as audio. The audio output unit 485 can be configured as one of various speakers.

The digital receiver 400 may further include the sensing unit (not shown) for sensing a gesture of the user, which includes at least one of a touch sensor, a voice sensor, a position sensor, and an action sensor, as described above. A signal sensed by the sensing unit (not shown) can be delivered to the controller 470 through the user input interface 450. The digital receiver 400 may further include the photographing unit (not shown) for photographing the user. Image information acquired by the photographing unit (not shown) can be supplied to the controller 470. The controller 470 may sense a gesture of the user from an image captured by the photographing unit (not shown) or a signal sensed by the sensing unit (not shown), or by combining the image and the signal.

The power supply unit 490 may supply power to the digital receiver 400. Particularly, the power supply unit 490 can supply power to the controller 470 which can be implemented as a system-on-chip (SoC), the display unit 480 for displaying images, and the audio output unit 485 for audio output.

The remote controller 500 may transmit user input to the user input interface 450. To achieve this, the remote controller 500 can use Bluetooth, RF communication, IR communication, UWB, ZigBee, etc. In addition, the remote controller 500 can receive audio, video or data signal output from the user input interface 350 and display the received signal or output the same as audio or vibration.

The functions of the application manager shown in FIG. 2 can be divided and executed by the controller 470, the storage unit 440, the user interface 450, the display unit 480 and the audio output unit 485 which are controlled by the controller 470.

The digital receivers shown in FIGS. 2 and 4 are exemplary and components thereof can be integrated, added or omitted according to specifications thereof. That is, two or more components can be integrated into one component or one component can be subdivided into two or more components as required. The function executed by each component is exemplified to describe embodiments of the present invention and detailed operations or devices do not limit the scope of the present invention. Some of the components shown in FIG. 2 may be omitted or a component (not shown in FIG. 2) may be added as required. The digital receiver according to the present invention may not include the tuner and the demodulator, differently from the digital receivers shown in FIGS. 2 and 4, and may receive content through the network interface or the external device interface and reproduce the content.

The digital receiver is an example of image signal processors which process an image stored therein or an input image. Other examples of the image signal processors may include a set-top box (STB) which does not include the display unit 380 and the audio output unit 485 shown in FIG. 4, a DVD player, a Blu-ray player, a game device, a computer, etc.

Figure 5:
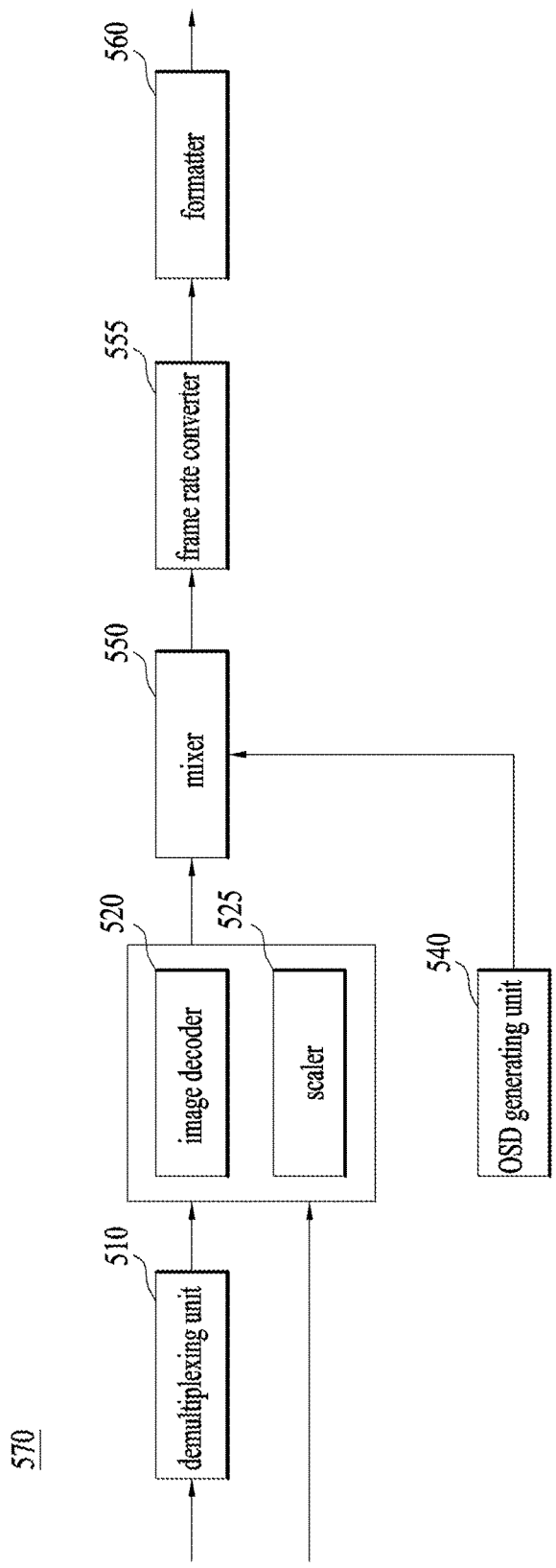
FIG. 5 is a block diagram for explaining one embodiment of detailed configuration of a control unit depicted in FIG. 2 to FIG. 4.

FIG. 5 illustrates a digital receiver according to another embodiment of the present invention. Particularly, FIG. 5 shows a configuration for implementing a 3D digital receiver, which can be included in the configurations of FIGS. 2 and 3.

The digital receiver according to the present invention may include a demultiplexer 510, an image processor 520, an OSD generator 540, a mixer 550, a frame rate converter (FRC) 555, and a 3D formatter (or an Output formatter) 560.

The demultiplexer 510 can demultiplex an input stream signal into an MPEG-2 TS image, an audio signal and a data signal, for example.

The image processor can process a demultiplexed image signal using a video decoder 525 and a scaler 535. The video decoder 525 can decode the demultiplexed image signal and the scaler 535 can scale the resolution of the decoded image signal such that the image signal can be displayed.

The image signal decoded by the image processor 520 may be input to the mixer 550.

The OSD generator 540 may generate OSD data automatically or according to user input. For example, the OSD generator 540 may generate data to be displayed on the screen of an output unit in the form of an image or text on the basis of a control signal of a user input interface. OSD data generated by the OSD generator 540 may include various data such as a user interface image of the digital receiver, various menu screens, widget, icons, and information on ratings. The OSD generator 540 can generate a caption of a broadcast image or data for displaying EPG based broadcast information.

The mixer 550 may mix the OSD data generated by the OSD generator 540 and the image signal processed by the image processor 520. The mixer 550 may provide the mixed signal to the 3D formatter 560. By mixing the decoded image signal and the OSD data, OSD may be overlaid on a broadcast image or external input image.

The frame rate converter (FRC) 555 may convert a frame rate of input video. For example, the frame rate converter 555 can convert the frame rate of an input 60 Hz video to a frame rate of 120 Hz or 240 Hz, according to an output frequency of the output unit. The frame rate converter 555 may be bypassed when frame conversion is not executed.

The 3D formatter 560 may change the output of the frame rate converter 555, which is input thereto, into a form suitable for the output format of the output unit. For example, the 3D formatter 560 can output an RGB data signal. In this case, this RGB data signal can be output according to low voltage differential signaling (LVDS) or mini-LVDS. When a 3D image signal output from the frame rate converter 555 is input to the 3D formatter 560, the 3D formatter 560 can format the 3D image signal such that the 3D image signal is matched to the output format of the output unit, to thereby support a 3D service.

An audio processor (not shown) may audio-process a demultiplexed audio signal. The audio processor (not shown) can support various audio formats. For example, when audio signals are encoded in MPEG-2, MPEG-4, advanced audio coding (AAC), high efficiency-AAC (HE-AAC), AC-3 and bit sliced audio coding (BSAC) formats, the audio processor (not shown) can include decoders corresponding to the formats to process the audio signals. Furthermore, the audio processor (not shown) can control base, treble and volume.

In addition, a data processor (not shown) can process a demultiplexed data signal. For example, when a demultiplexed data signal is encoded, the data processor (not shown) can decode the encoded demultiplexed data signal. Here, the encoded data signal may be EPG information including broadcast information such as the start time and end time (or duration) of a broadcast program which is broadcast through each channel.

Figure 6:
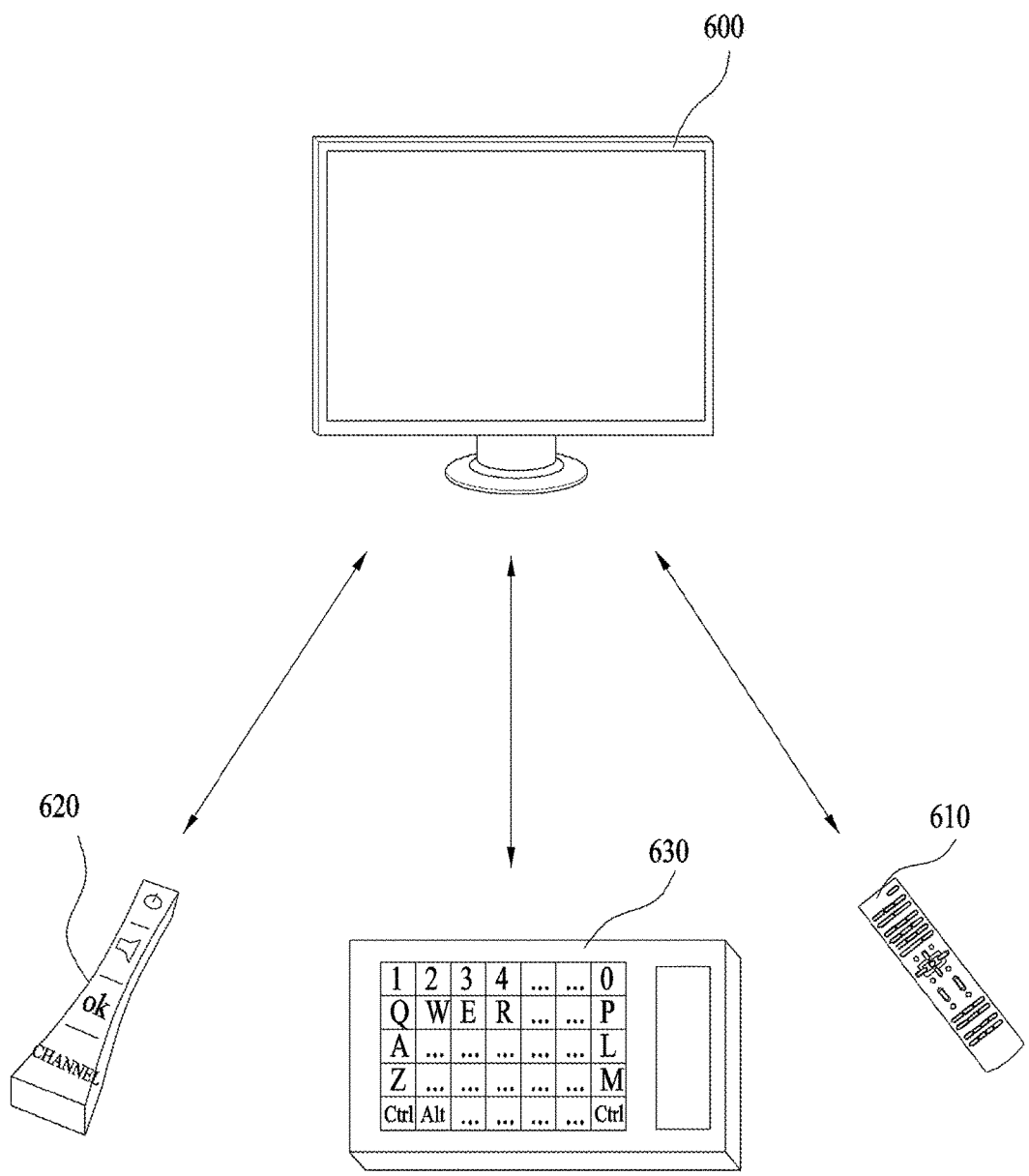
FIG. 6 is a diagram for a digital device depicted in FIG. 2 to FIG. 4 and a control means of the digital device.

FIG. 6 illustrates remote controllers of a digital receiver according to an embodiment of the present invention.

To execute various operations for implementing the present invention according to embodiments, various user interface devices (UIDs) which can communicate with a digital receiver 600 in a wired/wireless manner can be used as remote controllers.

The remote controllers can use various communication protocols such as Bluetooth, RFID, IrDA, UWB, ZigBee, DLNA, etc.

UIDs can include a mobile device (e.g., a smart phone, a tablet PC, and the like), a magic remote controller 620 and a remote controller 630 equipped with a keyboard and a touch pad in addition to a general remote controller 610.

The magic remote controller 620 may include a gyro sensor mounted therein to sense vibration of a user's hand or rotation. That is, the magic remote controller 620 can move a pointer according to up, down, left and right motions of the user such that the user can easily execute a desired action, for example, easily control a channel or a menu.

The remote controller 630 including the keyboard and touch pad can facilitate text input through the keyboard and control of movement of a pointer and magnification and reduction of a picture or video through the touch pad.

FIG. 7 is a diagram for explaining a process of installing an STB application in a digital device according to one embodiment of the present invention.

The digital device can install an STB application in the digital device in a manner of downloading the STB application from a charged service provider via an IP.

First of all, if a power of the digital device is turned on, a live broadcasting in an RF mode is provided to a screen 710 of the digital device. This is because the STB application is not installed in the digital device yet. If the STB application is installed, the screen of the digital device provided after the power is turned on may vary according to a service mode (RF mode or external input mode (a charged broadcasting service mode according to the present invention)) before the power is turned off. Regarding this, it shall be described in detail later and omitted at this time.

If a user makes a request for a home screen based on one (hereinafter called a remote device) of various input devices depicted in FIG. 6, the digital device provides the home screen (or smart home) 720 including a premium board, which provides the STB application related to the present invention, to the user. In this case, the premium board is provided on the screen 720 in a manner of including at least one STB application and can be selected by the user. The STB application is provided by a specific service provider and the service provider can generate and provide one or more STB applications.

If at least one STB application is selected from the premium board, the digital device downloads the selected STB application from a corresponding server and the like via such a wired/wireless network as an IP or the like and installs the STB application in the digital device. A process of downloading and installing is outputted via the screen 730 to make the user intuitively recognize the process.

Subsequently, the user may use a charged service by executing the STB application. In this case, because of the nature of the charged service, a user authentication process is required. For instance, as depicted in FIG. 7, the user authentication process determines whether the user or the digital device has subscribed for the charged service or not.

After determining whether the user or the digital device has subscribed for the charged service or not, if the user or the digital device corresponds to a subscriber of the charged service, the user or the digital device can use the charged service by executing the STB application. Yet, as a result of the determination, if the user or the digital device does not correspond to the subscriber of the charged service, the STB application can be executed and the charged service can be received after passing through such a process as a service subscription procedure including a contact data, authentication, and the like.

In the foregoing description, if the STB application is installed, the digital device can provide the charged service in various ways to the user according to whether the digital device supports an IPTV mode.

When the digital device supports the IPTV mode, if a picture-in-picture (PIP) form is selected, the digital device can provide a selected charged broadcasting service to the user via a screen. When the digital device does not support the IPTV mode, if a charged broadcasting service-dedicated board is selected or a charged broadcasting service icon is selected from a my app screen or a legacy home screen, the digital device can provide a selected charged broadcasting service to the user via the screen.

Or, if the STB application is installed, the digital device executes a search application or a search engine via a remote device to search for charged broadcasting service contents even though it is not the home screen or the my app and may be then able to provide a list of the searched charged broadcasting service contents on the screen. If the list of the charged broadcasting service contents is provided on the screen, a user can select one or more charged broadcasting service contents. And, the digital device configures a page for purchasing the selected charged broadcasting service content and provides the page to the user. Subsequently, the user can watch the charged broadcasting service content purchased via the page using the digital device.

Or, the digital device can use a charged broadcasting service in a manner of receiving such a recommendation as a VOD recommendation list via the STB application installed in advance instead of the search application or the search engine while watching a live broadcasting via a legacy antenna. In this case, for instance, the recommendation may correspond to a series, a broadcasting which has been already broadcasted, or content in which a main character or a background is identical or similar to the content currently watching by a user via the live broadcasting. Or, the recommendation may include latest update VOD content as well.

Or, while using a charged broadcasting content via the digital device, a user searches for latest update content via a remote device, selects a charged broadcasting service icon, and may be then able to use the latest update content by purchasing the content.

Meanwhile, depending on whether a charged broadcasting service supports an IPTV mode, a process of accessing the charged broadcasting service, a process of using the charged broadcasting service, and the like may be different from each other.

First of all, a method of processing the charged broadcasting service is described in the following in case that the IPTV mode is supported.

Figure 8:
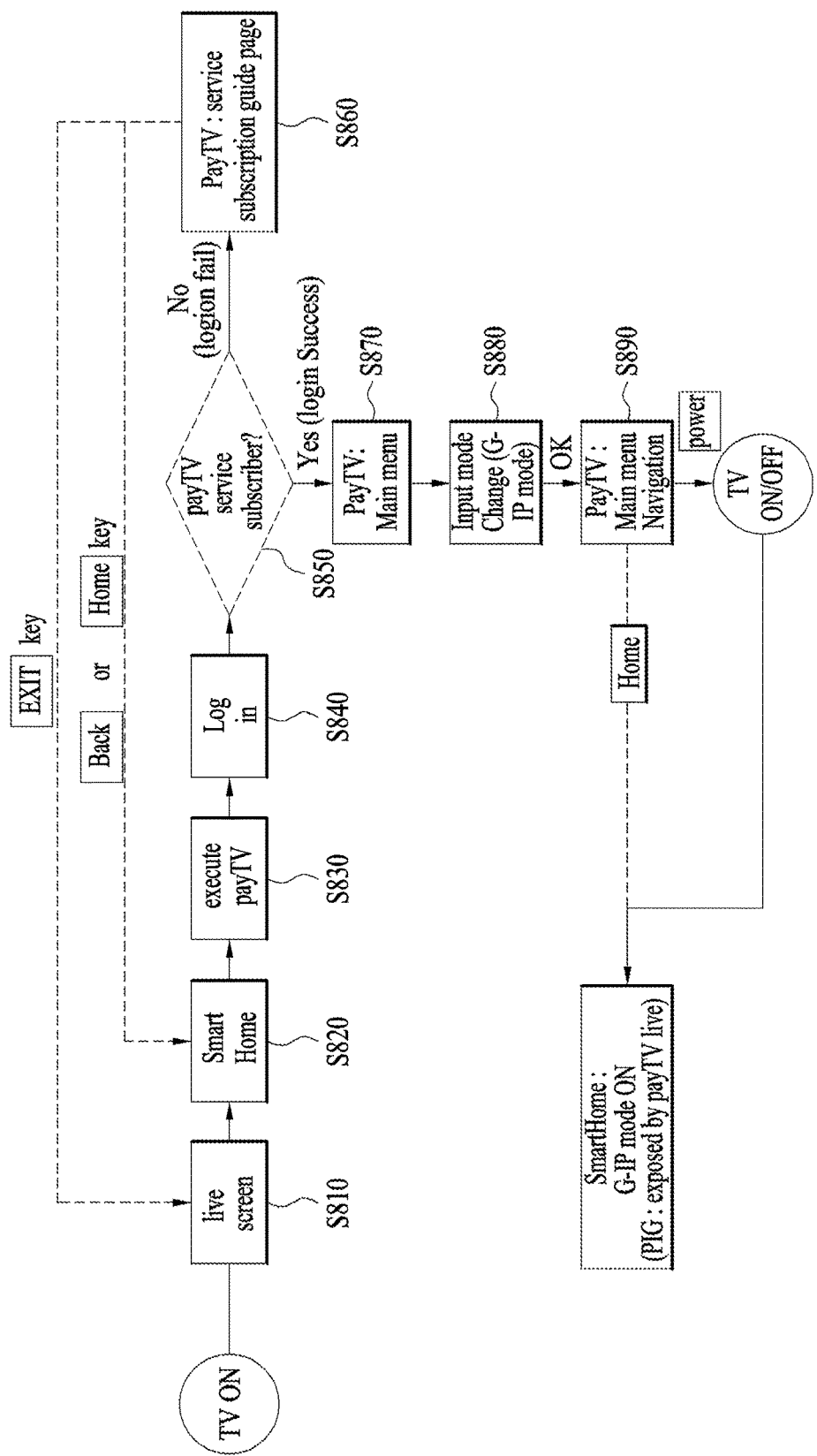
FIG. 8 is a flowchart for explaining a method of processing a charged broadcasting service in case of supporting an IPTV mode according to one embodiment of the present invention.

FIG. 8 is a flowchart for explaining a method of processing a charged broadcasting service in case of supporting an IPTV mode according to one embodiment of the present invention.

If a power of the digital device is turned on, the digital device provides a live screen (S810).

While using the live screen, if a user pushes a home button via a remote device or the like, the digital device provides a home screen (S820).

If the user selects a charged broadcasting service in the home screen and makes a request for executing the charged broadcasting service, the digital device provides an execution screen of the charged broadcasting service to the user (S830).

If the user log in via the execution screen of the charged broadcasting service (S840), the digital device determines whether the user corresponds to a subscriber of the charged broadcasting service (S850). The determination may be performed in a server that provides the charged broadcasting service.

As a result of determining whether the user corresponds to a subscriber of the charged broadcasting service in the step S850, if the user fails to log in, i.e., if the user does not correspond to the subscriber of the charged broadcasting service, the digital device configures a subscription guide page or a subscription inducement page for a charged service subscription and provides the page on the screen (S860).

As a result of determining whether the user corresponds to a subscriber of the charged broadcasting service in the step S850, if the user succeeds to log in, i.e., if the user corresponds to the subscriber of the charged broadcasting service, the digital device provides a main page of the charged broadcasting service to the user (S870).

After the step S870, if the digital device supports the IPTV mode, the user changes an input mode to G-IP mode on the main page of the charged broadcasting service (S880).

Subsequently, the user navigates the charged broadcasting service in the G-IP mode via the digital device and uses the charged broadcasting service (S890).

Meanwhile, in the step S860, if the user pushes an EXIT key via the remote device, the user can go back to the step S810. If the user pushes a Back key or a Home key, the user can go back to the step S820.

And, unlike the aforementioned step S860, if the user pushes the Home key in the step S890, a charged broadcasting service provider-dedicated board is generated on the home screen in case of authenticating the subscriber of the charged broadcasting service and the home screen including the generated board can be provided to the user. Besides, if the power of the digital device is turned off and turned on again in the step S890, the digital device can preferentially provide the home screen to the user after searching in the G-IP mode.

Meanwhile, in the foregoing description, the G-IP mode may mean to change an input mode itself like an external input mode does. Hence, the G-IP mode supporting the charged broadcasting service by the STB application is considered as an external input.

FIG. 9 is a diagram for explaining a home screen UI of an IPTV supporting mode according to one embodiment of the present invention.

FIG. 9 may correspond to a screen provided by the digital device in case that the user pushes the Home key via the remote device when the power of the digital device is turned on after the aforementioned step S880 of FIG. 8. Referring to the aforementioned step S880, since the power of the digital device is turned off after the input mode has changed from the live broadcasting mode to the G-IP mode, if the power of the digital device is turned on again, the digital device provides a screen such as FIG. 9(a) to the user. Meanwhile, in case of the live broadcasting mode, when the display device is turned on again, a screen used to be provided while the display device is turned off is provided to the user. On the other hand, in case of the G-IP mode, a home screen (Today's board) such as FIG. 9(a) can be provided to the user.

Referring to FIG. 9(a), charged broadcasting service content is provided in a first area 910 and broadcasting information on the content is provided under the first area. And, a list of contents possessed by a service provider who has provided the STB application can be provided in the remaining area. Meanwhile, the charged broadcasting service content provided in the first area 910 may correspond to a previously purchased charged broadcasting service content watched by the user immediately before the screen of FIG. 9(a) is provided or immediately before the display device is turned off. Yet, if there does not exist the previously purchased charged broadcasting service content or the content watched by the user, such a content commercial provided by the service provider providing the STB application as a broadcasting preview, other commercial video, or the like may be provided in the first area.

Similar to a live broadcasting, if the user selects the charged broadcasting service content provided in the first area 910 via the remote device as depicted in FIG. 9(a), the selected content can be continuously provided on a whole screen in a manner of being expanded as depicted in FIG. 9(b).

Meanwhile, FIG. 9 has explained the example that the charged broadcasting service is already provided on the home screen (Today's board) and the user watches the charged broadcasting service on the whole screen in a manner of selecting the service. Besides, a live broadcasting content is provided in the first area 910 of the home screen and the user can approach a charged broadcasting service with a scheme similar to the aforementioned scheme via a charged broadcasting service application among premium apps installed in my app.

In the present specification, since the G-IP mode is different from the RF mode, a service can be provided after an input mode is automatically or manually changed to an external input (i.e., execute by the STB application) mode. In relation to this, in case of providing a charged broadcasting service, the digital device notifies a user that the input mode is changed to the external input mode via an UI of such a form as pop-up and the like to make the user recognize the change. Or, an indicator or an identifier indicating that a user is currently watching a charged broadcasting service in the external input mode can be provided in a prescribed area of a screen together with an identifier identifying a service provider for the charged broadcasting service content provided on the whole screen to make the user recognize that the service currently watching is the charged broadcasting service.

Figure 10:
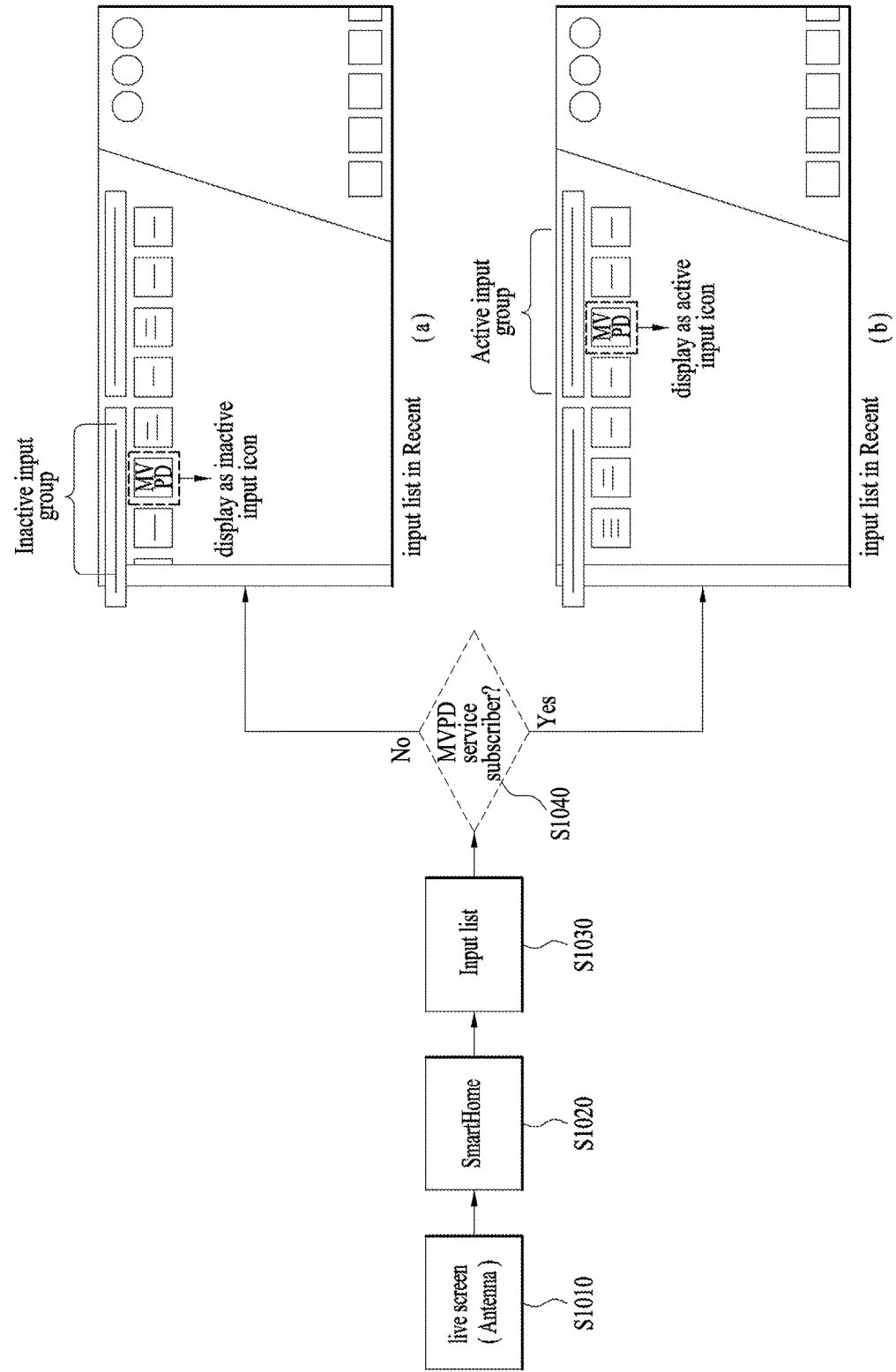
FIG. 10 is a diagram for explaining a method of identifying a charged broadcasting service in case of requesting a recent list according to one embodiment of the present invention.
Figure 11:
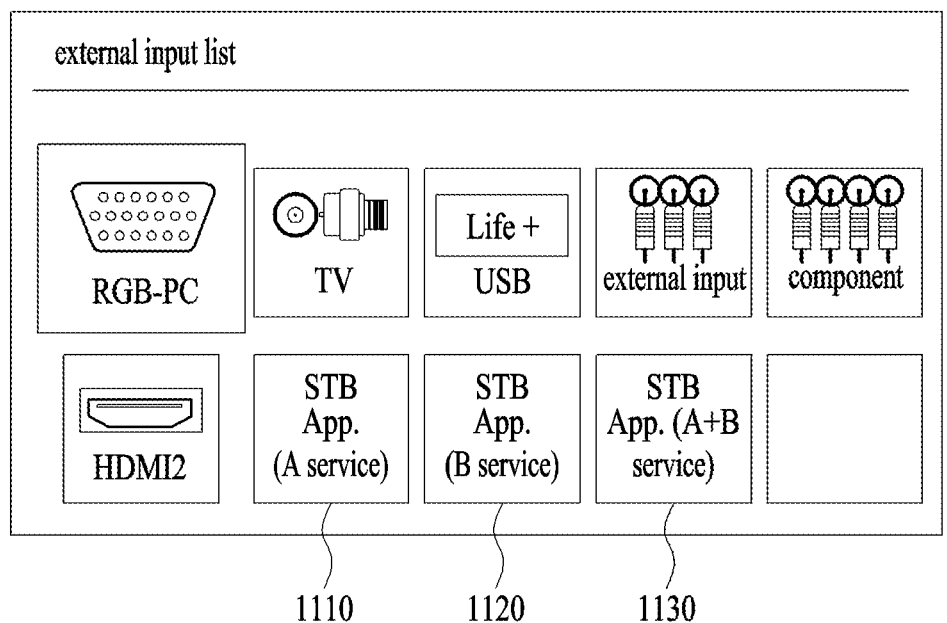
FIG. 11 is a diagram for an external input list according to one embodiment of the present invention.

FIG. 10 is a diagram for explaining a method of identifying a charged broadcasting service in case of requesting a recent list according to one embodiment of the present invention and FIG. 11 is a diagram for an external input list according to one embodiment of the present invention.

Referring to FIG. 10, as mentioned in the foregoing description, the digital device provides a live broadcasting screen to a user (S1010) and a home screen is provided to the user when the user pushes a Home key via the remote device (S1020).

If the user selects an input mode, the user can change the input mode from the RF mode to the external input mode (S1030). In this case, if the user makes a request for the input mode, an external input mode UI 1110 depicted in FIG. 11 can be outputted. In particular, if downloading and installation of the STB application is completed in FIG. 7 to FIG. 8, one or more STB applications 1110/1120 capable of being selected are provided in addition to an RGB-PC, a TV, a USB, an external input, a component, a HDMI2 depicted in FIG. 11. If the user selects at least one of a first STB application 1110 for an A service, a second STB application 1120 for a B service, or a third STB application 1130 for a service in which the A service and the B service are mixed or combined with each other, following process may be underwent. As depicted in FIG. 11, if the user makes a request for an input list of the digital device, unlike a traditional way, the STB application(s) for a charged service is provided as an external input list capable of being selected. Hence, the user can easily approach the charged service.

If a recent list is accessed according to a request of a user, an UI such as FIG. 10(a) 1010 or FIG. 10(b) 1020 is provided depending on whether the user or the digital device corresponds to a subscriber of a charged broadcasting service (S1040).

As a result of determining whether the user or the digital device corresponds to the subscriber of the charged broadcasting service in the step S1040, if the user or the digital device does not correspond to the subscriber of the charged broadcasting service, the digital device provides the UI 1010 of FIG. 10(*a*) to the user in response to the recent list request of the user.

The UI 1010 mainly includes two groups. One group is an inactive input group in the digital device and another group is an active input group in the digital device.

In case of FIG. 10(*a*), the digital device outputs the UI to make a user identify that a charged broadcasting service list belongs to the inactive input group.

In this case, for instance, if the user selects the charged broadcasting service list belonging to the inactive input group, the digital device provides a guide page for a subscription of the charged broadcasting service to the user with a pop-up form in a prescribed area.

On the contrary, although a UI 1020 is implemented by a form identical to the aforementioned UI 1010, in case of FIG. 10(*b*), since the user or the digital device has already subscribed for the charged broadcasting service, the digital device outputs the UI to make the user identify that the charged broadcasting service list belongs to the active input group. In this case, if the user selects the charged broadcasting service list belonging to the active input group, the digital device provides a screen such as depicted in FIG. 9(*a*) or FIG. 9(*b*) to the user.

Figure 12:
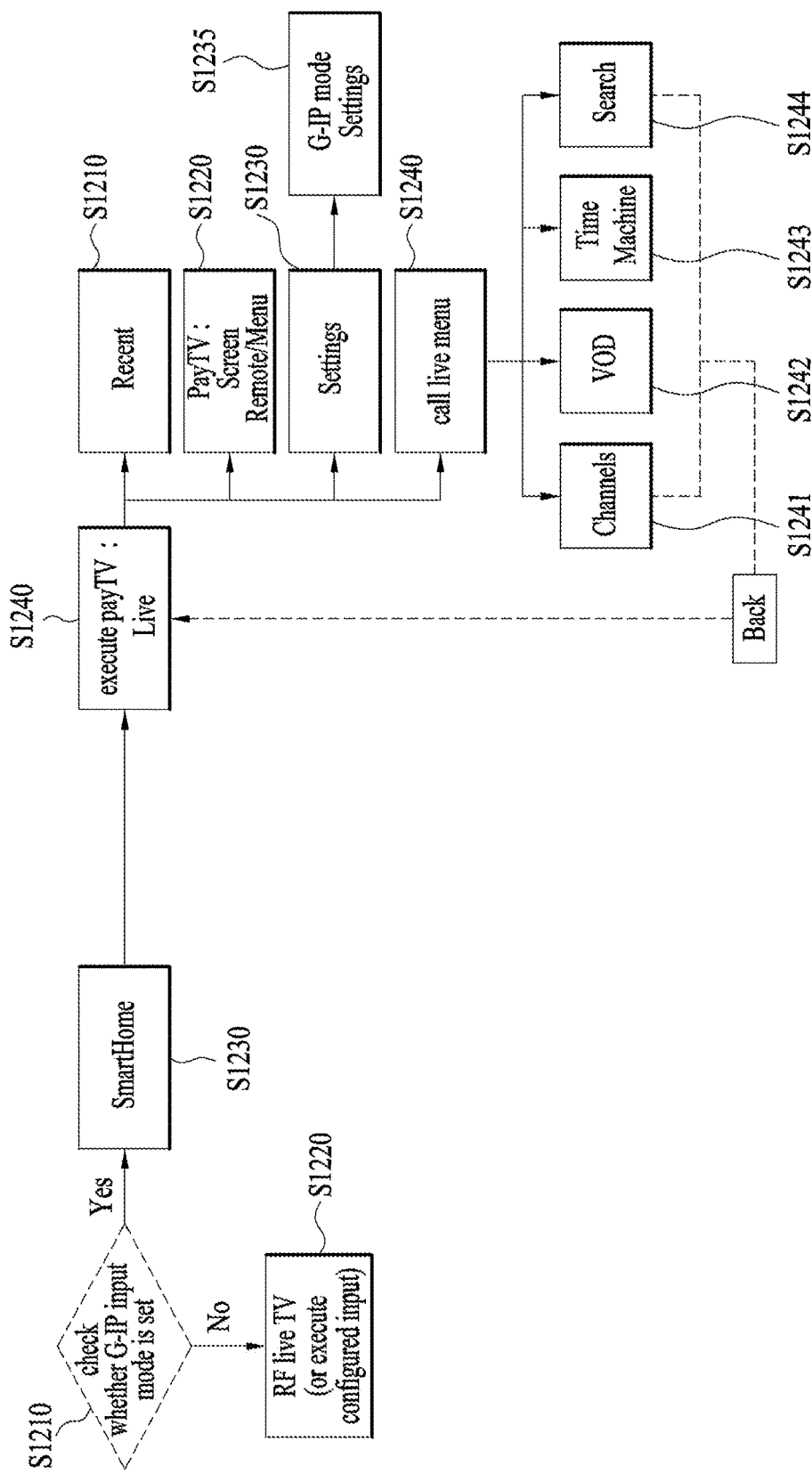
FIG. 12 is a flowchart for explaining a method of synchronizing a live content in an IPTV supporting mode according to one embodiment of the present invention.

FIG. 12 is a flowchart for explaining a method of interlocking with a live content in an IPTV supporting mode according to one embodiment of the present invention.

If power is turned on, the digital device checks whether a G-IP mode is set (S1210). In this case, for instance, a user may or may not set the G-IP mode. Although the user does not set the G-IP mode, the digital device can check whether the G-IP mode is set. This can be done by checking whether the digital device corresponds to the RF mode or the external input mode, i.e., the G-IP mode before the power of the digital device is turned on.

As a result of checking whether the G-IP mode is set in the step S1210, if the G-IP mode is set to the digital device, the digital device provides a home screen to the user (S1230). In this case, the home screen may correspond to the drawing depicted in FIG. 9(*a*) for example.

Subsequently, if the user selects a charged broadcasting service content (e.g., the first area of FIG. 9(*a*)) provided on the home screen, the charged broadcasting service is provided on a whole screen in live (S1240).

Subsequently, the digital device can provide a recent list 1210, a screen remote/menu list 1220, a setting list 1230, a live menu calling list 1240, and the like on the screen on which the live charged broadcasting service content is provided according to the user selection.

In this case, if the user selects the setting list 1230, the digital device can provide a G-IP mode setting screen 1235 to the user as a sub list.

Meanwhile, if the user selects the live menu calling list 1240, the digital device can provide such sub menu items as a channel list 1241, a VOD list 1242, a time machine list 1243, a search 1244, and the like to the user.

FIG. 13 is a diagram for explaining a method of approaching a live recent list in the course of watching a live content of an IPTV supporting mode according to one embodiment of the present invention.

FIG. 13(*a*) corresponds to a live charged broadcasting service content provided on a whole screen via the aforementioned step of S1240 of FIG. 12.

In this case, as depicted in FIG. 13(*b*), if a user clicks an icon 1310, which is provided by pointing an edge of a screen, via a remote device, a recent list 1320 is provided on the screen on which the live charged broadcasting service content is provided as depicted in FIG. 13(*c*). In this case, for instance, the recent list 1320 can be provided by a scheme identical or similar to a recent list accessed in a legacy live broadcasting.

Figure 14:
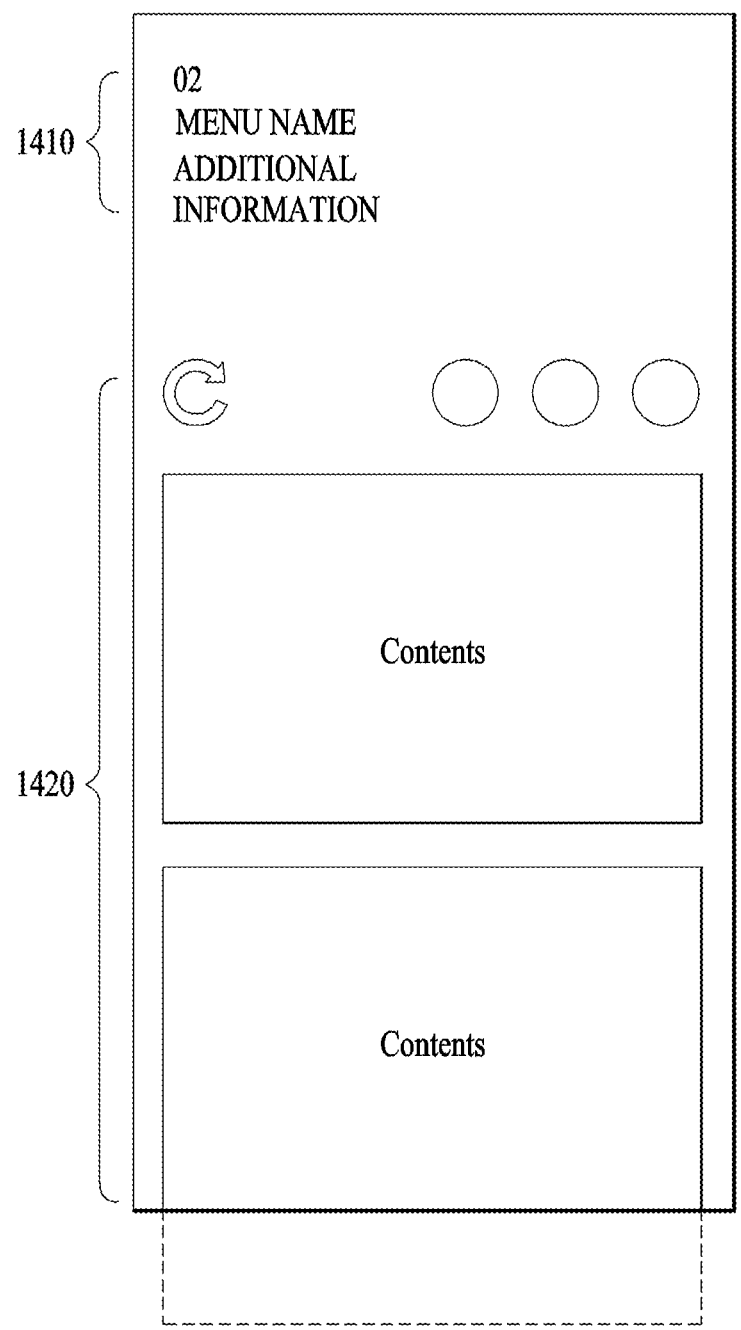
FIG. 14 is a diagram for explaining a live menu item according to one embodiment of the present invention.

FIG. 14 is a diagram for explaining a live menu item according to one embodiment of the present invention. In this case, FIG. 14 mainly consists of two parts.

A first part 1410 includes at least one selected from the group consisting of a main menu item (payTV main menu), a channel list item (live channels), a related/recommended content item (recommend), a search/hot keyword/clip item (search), a recorded content item (recorded), a multi-tasking item (multi-view), and the like.

The main menu item (payTV main menu) is an item used for a user to enter a main menu or a home screen of a charged broadcasting service subscribed by the user. If the user selects a previous menu, the user can move to a corresponding depth.

The channel list item provides a list of channels currently broadcasting to the user. In this case, the list of channels can be searched by a preferred form such as a next program, a popular channel number, a preferred channel/genre, and the like.

The related/recommended content item is an item used to recommend content, a popular content, and the like based on a broadcasting currently watching or a history of a user. A user customized content may correspond to a pattern and reservation function-based VOD. For instance, the popular content may correspond to a popular, free, latest VOD.

The search/hot keyword/clip item provides an integrated search function, a function of linking to the integrated search function, and the like to a user based on a TV popular search word or a search word requested by the user. The present item can receive a search word of a text, an audio, and the like via the remote device.

The recorded content item provides a list of a recommended content automatically recoded and a content selectively recorded by a user.

The multi-tasking item provides such a simple multi-tasking function as web browsing and the like to a user while the user is watching a live broadcasting.

A second part 1420 includes at least one selected from the group consisting of a title area, an information area, a refresh area, a content providing area, and the like.

The title area provides title information of a live charged broadcasting service content currently broadcasting.

The information area provides additional information on the content as well as information on a service provider providing the live charged broadcasting service content.

The refresh area updates information on the second part including the following content providing area and the like. The refresh area updates not only a software version but also the information itself on the second part.

The content providing area may provide a thumbnail image or a video of a corresponding live content and detail information on the content selected in the first part to a user.

Figure 15:
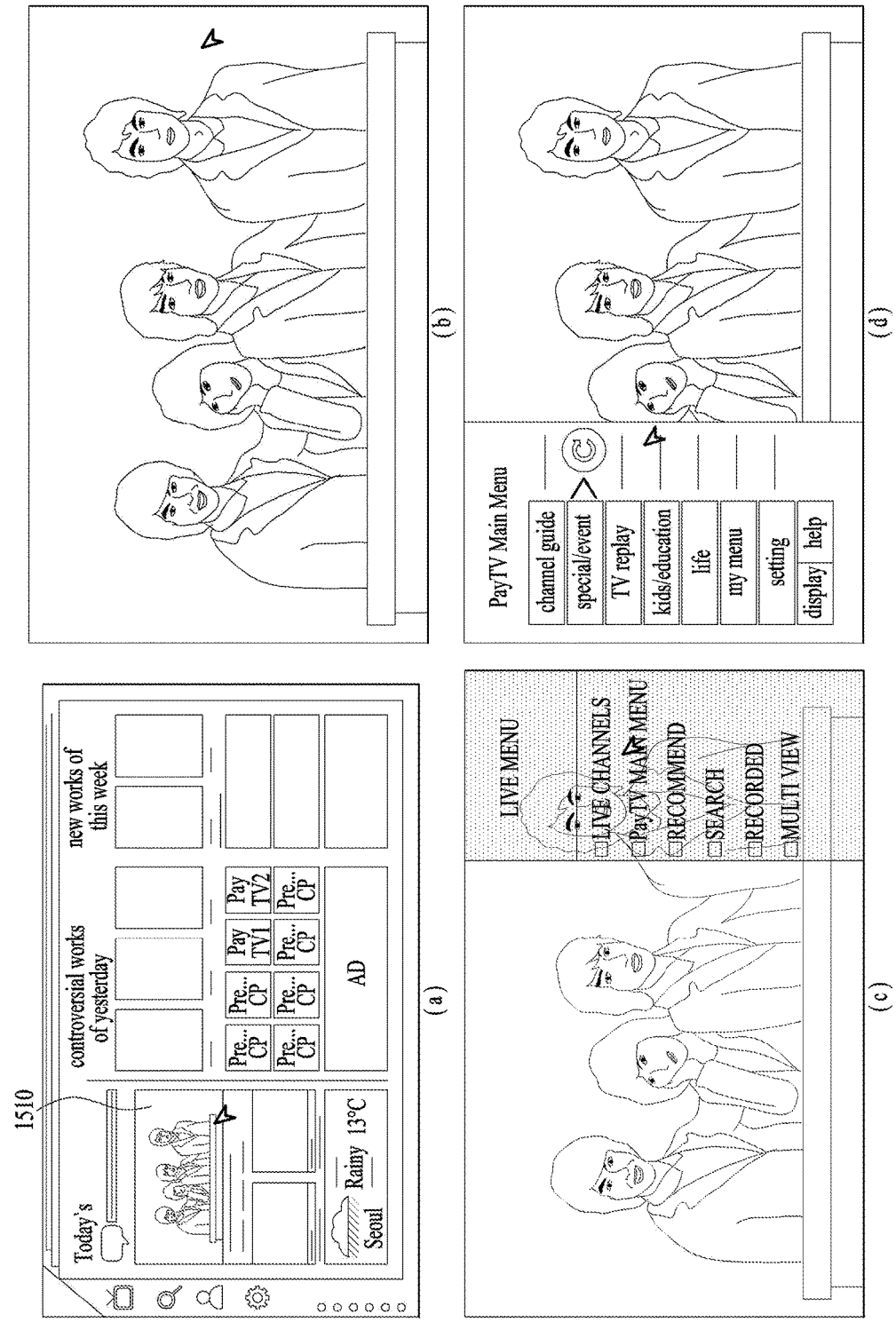
FIG. 15 is a diagram for explaining a screen providing a live charged broadcasting service content including the aforementioned live menu according to one embodiment of the present invention.

FIG. 15 is a diagram for explaining a screen providing a live charged broadcasting service content including the aforementioned live menu according to one embodiment of the present invention.

As depicted in FIG. 15(a), if live charged broadcasting service content is outputted in a first area 1510 of a home screen and a user selects the live charged broadcasting service content in the first area 1510, the live charged broadcasting service content is outputted on a whole screen as depicted in FIG. 15(b).

As depicted in FIG. 15 (b), if the user selects a live menu via a remote device or moves a pointer to a right edge of a screen in the course of watching the live charged broadcasting service content on the whole screen, the live menu is provided to the user as depicted in FIG. 15(c).

In this case, the live menu depicted in FIG. 15(c) includes the items of the first part mentioned earlier in FIG. 14.

In this case, if the user selects the charged broadcasting service main menu item in the live menu, the live menu disappears and the charged broadcasting service main menu item is outputted as depicted in FIG. 15(d).

Figure 16:
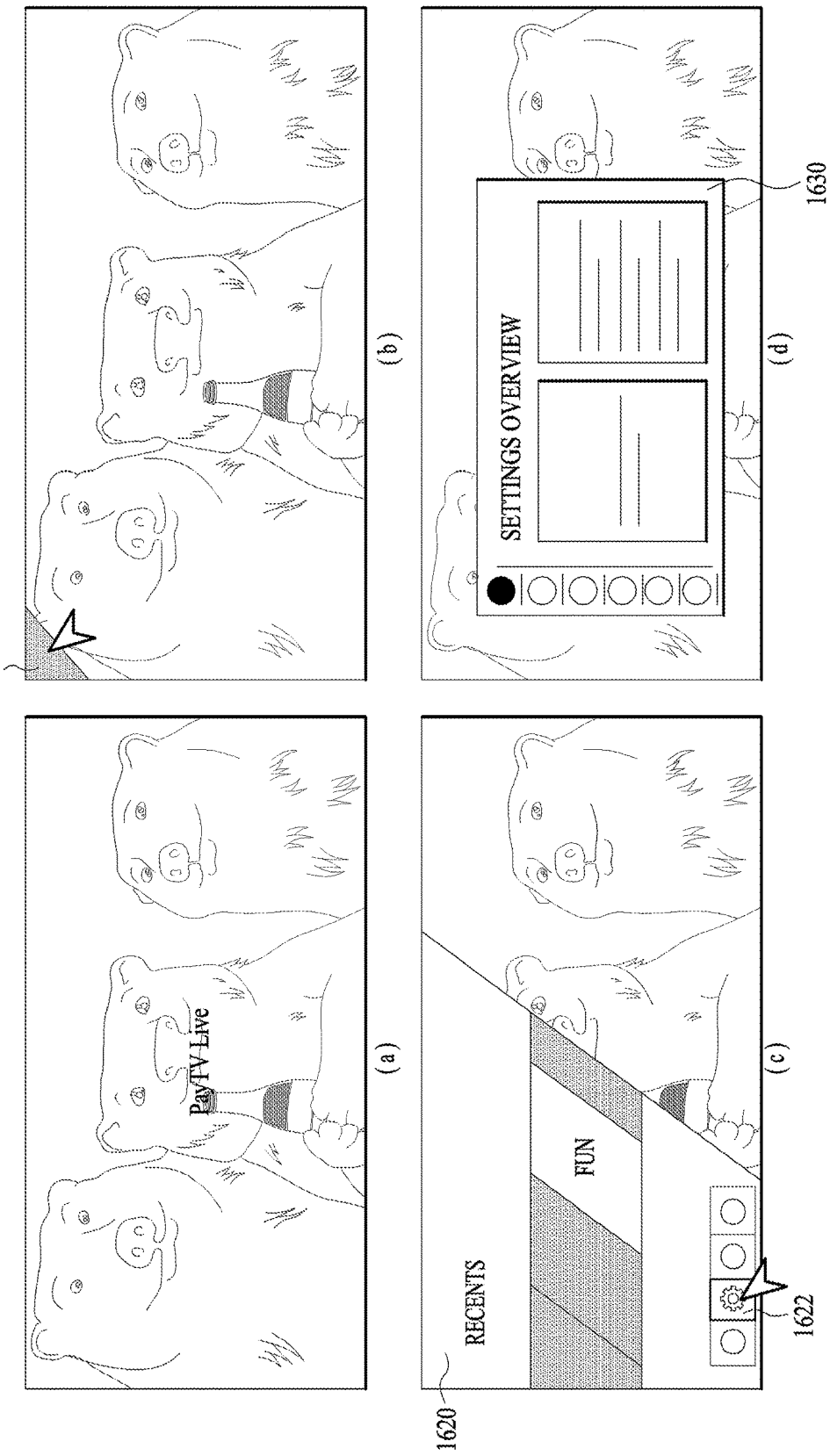
FIG. 16 is a diagram for explaining a method of entering a setting screen from a screen providing a live charged broadcasting service content according to one embodiment of the present invention.

FIG. 16 is a diagram for explaining a method of entering a setting screen from a screen providing a live charged broadcasting service content according to one embodiment of the present invention.

As depicted in FIG. 16(a), if a user points at a prescribed area of a screen while live charged broadcasting service content is provided on the whole screen, an icon 1610 capable of being selected is provided on the screen as depicted in FIG. 16(b). In the FIG. 16(b), the icon capable of being selected may correspond to an icon used for entering the aforementioned recent list.

In FIG. 16(b), if the icon 1610 is clicked, a recent menu item 1620 is outputted as depicted in FIG. 16(c).

An area in which content is provided and other option items are outputted in the recent menu item 1620 depicted in FIG. 16(c). The option items include a setting item 1622.

In FIG. 16(c), if the user selects the setting item 1622 via the remote device, the digital device outputs a setting item menu 1630 including a setting overview depicted in FIG. 16(d).

Figure 17:
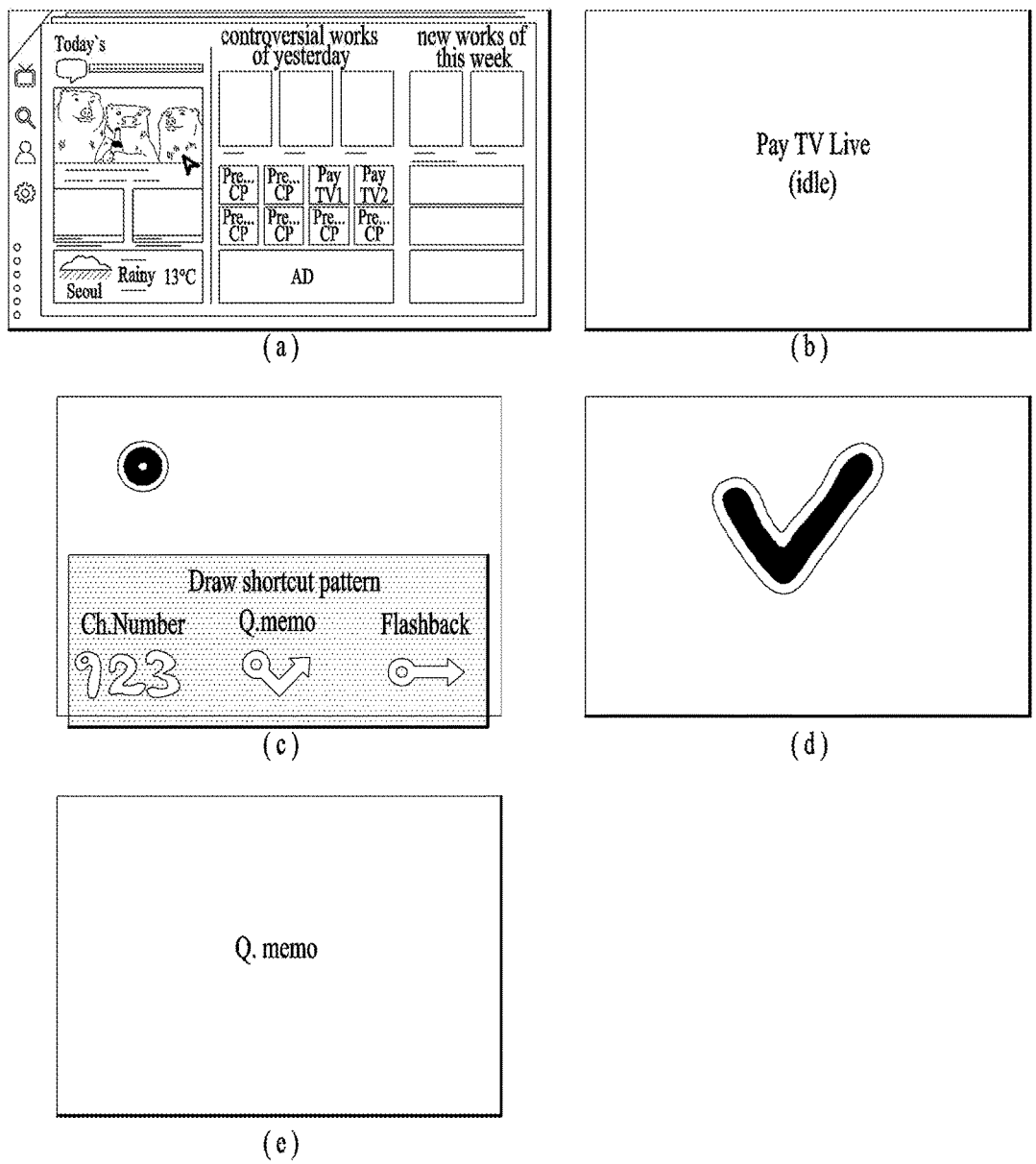
FIG. 17 is a diagram for explaining a method for a user to resister and process a gesture mapped to a function related to a use of a service in case of using the charged broadcasting service according to one embodiment of the present invention.

FIG. 17 is a diagram for explaining a method for a user to resister and process a pattern gesture mapped to a function related to a use of a service in case of using a charged broadcasting service according to one embodiment of the present invention.

In case of using a charged broadcasting service, a pattern gesture plays a role of easily going back to a specific screen, a function, a menu, a home, and the like. A gesture corresponding to a shortcut to which a function execution process of passing through many depths to go back to a function of a frequent use, a home screen, or the like is separately registered is registered for the pattern gesture.

Meanwhile, the pattern gesture may provide a registration screen such as FIG. 17(a) to a user by using a specific key of the remote device or a specific action.

For instance, if the user presses a pointer of the remote device for a long time more than a predetermined time, the display device can provide a screen used for registering a shortcut pattern to the user.

In this case, if a shortcut pattern gesture depicted in FIG. 17(a) is outputted after the user set a function, an item, a menu, a gesture, or the like in advance, the user can easily configure the shortcut pattern gesture to be mapped to each of the function, the item, the menu, the gesture, or the like. Or, if the user selects a specific function or an item and takes a specific gesture, the specific gesture can be mapped to the specific function or the item.

For instance, assume that the user wants to perform a quick memo while using a charged broadcasting service in FIG. 17(a). Referring to FIG. 17(a), it is defined that the quick memo is executed when the user takes a gesture of a check form with the remote device.

After registering the gesture in FIG. 17(a), if the user takes a gesture of the check form with the remote device in the course of using the charged broadcasting service as depicted in FIG. 17(b), the digital device preferentially recognizes the gesture of the user depicted in FIG. 17(b).

The digital device compares the recognized gesture with a predetermined and/or a pre-stored pattern gesture and identifies what the recognized gesture means.

If the recognized gesture is identified as an execution of the quick memo, the digital device executes a function of the quick memo while the user uses the charged broadcasting service.

Meanwhile, referring to FIG. 17(c), the charged broadcasting service is completely replaced with the quick memo function in a manner of temporarily stopping or terminating the charged broadcasting service. Yet, the quick memo function can be provided by a PIP form or a pop-up form in a prescribed area on the charged broadcasting service screen.

Yet, the pattern gesture defined in FIG. 17 may be applicable to the charged broadcasting service only and may be not applicable to a general live broadcasting mode and the like according to a configuration of the user.

Meanwhile, although it is not depicted, voice recognition and the like may be immediately recognized if the user makes a request for a voice recognition mode via a separate key of the remote device or inputs a voice via the remote device. If the voice recognition mode operates, the digital device temporarily stops a charged broadcasting service currently providing, executes an avatar according to the activation of the voice recognition function, and provides the avatar on a screen. Or, the digital device may maintain playback of the charged broadcasting service currently providing without temporarily stopping the service, provide the voice recognition avatar in a prescribed area on the screen, and execute the corresponding function. In this case, a voice service of the charged broadcasting service, which is currently provided on the screen, can be temporarily muted or volume down in order not to interrupt the voice recognition. And, in the former case, since the playback of the corresponding service has already stopped, the screen on which the charged broadcasting service is provided is completely replaced with a screen for an additional operation according to the voice recognition and may report a result of the additional operation according to the voice recognition. In the latter case, since the charged broadcasting service is continuously played, a following service processing result can be reported using a part of the screen.

Or, although it is not depicted, an action of a user, i.e., a gesture instead of the voice recognition can be recognized by the digital device. The gesture is not a gesture inputted via such an input means as a remote device mentioned earlier in FIG. 17 but a direct action of the user capable of being recognized and processed by the digital device.

Yet, to this end, a camera sensor should be installed in the front of the digital device. Or, although it is not the digital device, a device should be equipped with a means capable of recognizing a gesture of the user.

Figure 18:
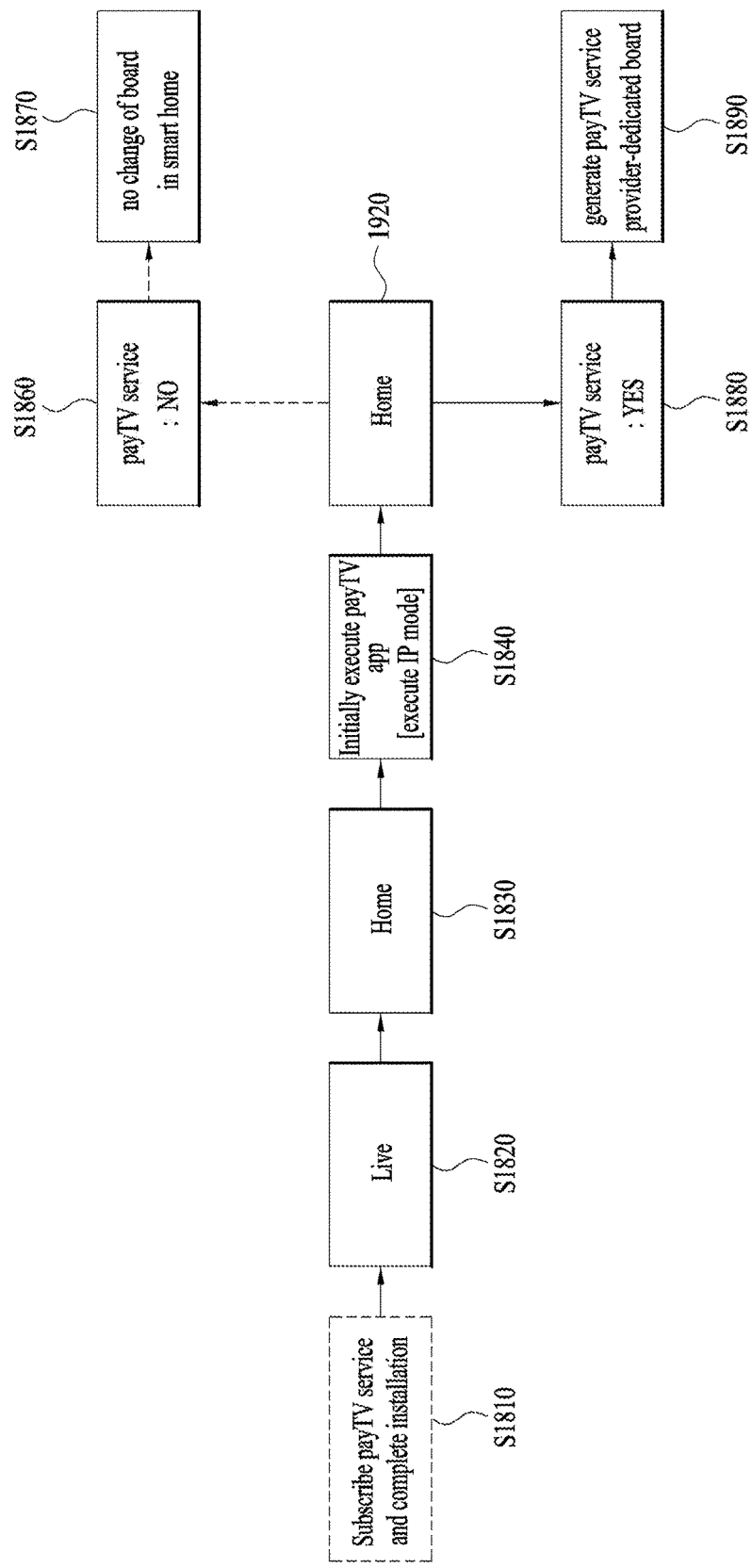
FIG. 18 is a flowchart for explaining a method of generating or adding a board for a charged broadcasting service supporting an IPTV mode in a digital device according to the present invention.

FIG. 18 is a flowchart for explaining a method of generating or adding a board for a charged broadcasting service in a digital device according to the present invention.

Referring to FIG. 18, if the digital device subscribes for a charged broadcasting service, an STB application for the charged broadcasting service is installed in the digital device (S1810), and if a user initially boots a TV after the user subscribes for the service, the digital device provides a live broadcasting screen to the user (S1820).

Subsequently, the digital device provides a home screen in response to an action of the user (S1830).

In this case, if the user initially executes the STB application for the charged broadcasting service, a G-IP mode is generated (S1840).

Subsequently, the home screen is provided again in response to the action of the user (S1850), if the user corresponds to a subscriber of the charged broadcasting service, a charged broadcasting service provider-dedicated board is generated (S1880) (S1890). The generated board is automatically exposed on the home screen. In this case, the board is detected in a manner of checking whether an IPTV external input mode exists within a TV external input list.

If the user does not correspond to the subscriber of the charged broadcasting service yet, there is no change of the board on the home screen (S1860) (S1870). In this case, the digital device can provide a page screen for guiding or inducing the subscription of the charged broadcasting service only.

In the foregoing description, a method of supporting the charged broadcasting service in the digital device supporting the IPTV mode is mainly explained. Yet, in case that the digital device does not support the IPTV mode, a board can be generated by a similar scheme. Yet, in this case, if the subscribed STB application is initially executed, a corresponding user or the digital device is authenticated in a server of a service provider of the charged broadcasting service. If the user or the digital device is successfully authenticated, whether the user or the digital device corresponds to the subscriber of the charged broadcasting service can be detected within a TV.

Figure 19:
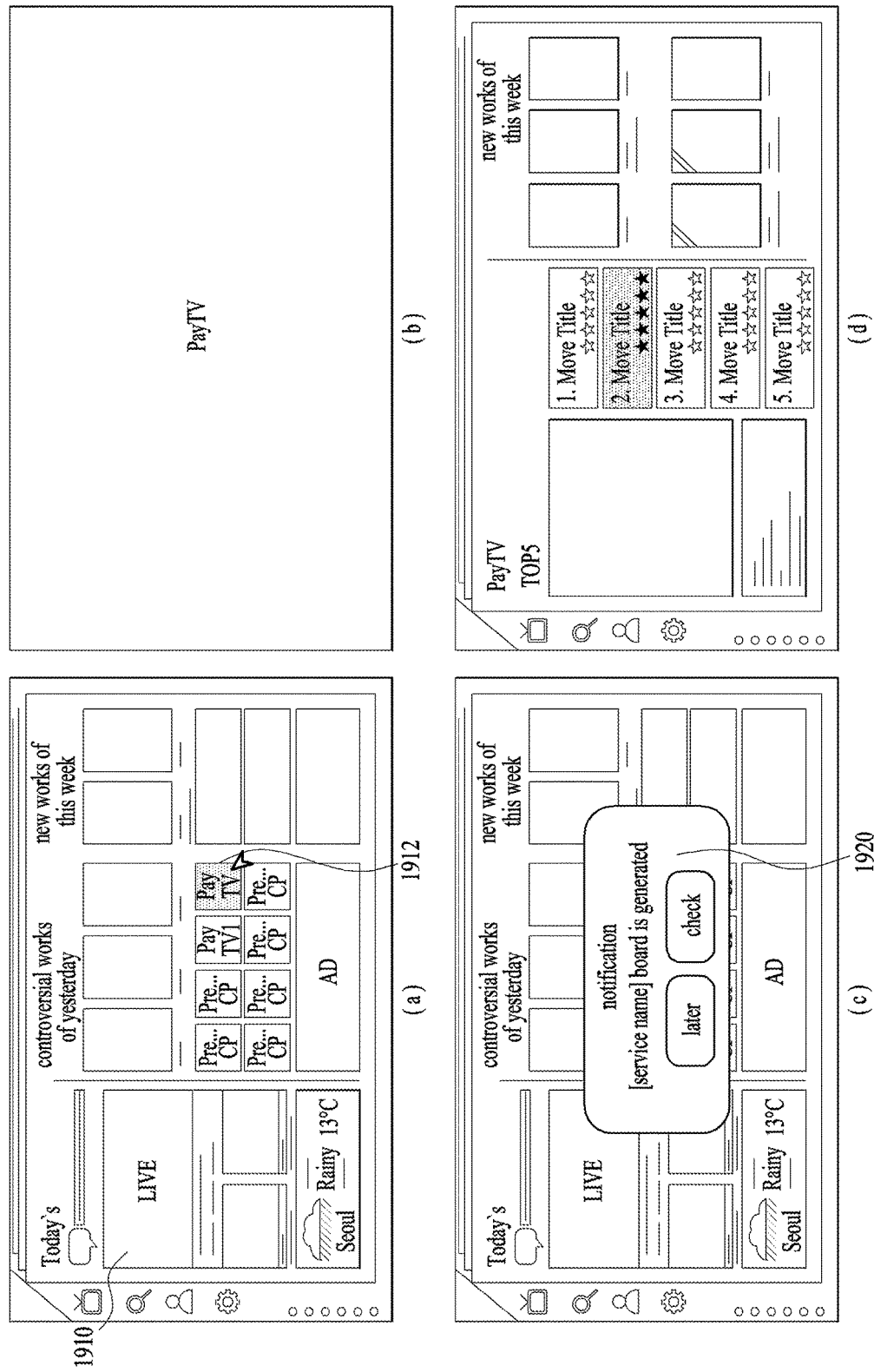
FIG. 19 is a diagram for explaining a process of generating a board for a charged broadcasting service in a digital device and an UI of a charged broadcasting service board which is generated according to the present invention.

FIG. 19 is a diagram for explaining a process of generating a board for a charged broadcasting service in a digital device and an UI of a charged broadcasting service board which is generated according to the present invention.

Referring to FIG. 19(a), the digital device provides a first board (smart home) screen 1910 to a user. In this case, if the user selects a charged broadcasting service icon 1912 among premium contents, the digital device provides such a charged broadcasting service as depicted in FIG. 19 (b) to the user on a whole screen.

As depicted in FIG. 19 (b), if the user makes a request for the home screen again after watching the charged broadcasting service, a message notifying the user that a board (a second board or a charged broadcasting service board) for the charged broadcasting service is generated is provided on the first board screen 1910 in a pop-up form.

Referring to FIG. 19 (c), the message 1920 asks the user whether to check the second board (charged broadcasting service board). In this case, if the user pushes a 'check' icon, the first board screen is switched to the second board screen as depicted in FIG. 19 (d). Yet, if the user pushes a 'later' icon in the message 1920, the legacy board (smart home) screen 1910 depicted in FIG. 19(a) is maintained. Meanwhile, in this case, if the user selects the charged broadcasting service icon 1912, a separately defined board approaching icon, or the like, the first board screen can be switched to the second board screen as depicted in FIG. 19 (d).

In the present specification, a board may correspond to a page provided on the screen of the digital device when the user pushes a home key via the remote device or the like. If a page configured with a legacy live broadcasting and the like corresponds to a first board (smart home), a page newly configured to provide convenience of approaching a charged broadcasting service as well as the legacy live broadcasting, related information, and the like may become a second board, i.e., a charged broadcasting service board in the present invention.

The second board may be similar to the first board in terms of a basic item. Yet, items to be configured, a category, attribute, and the like can be defined and configured in a new way in any degree according to a service provider providing a corresponding charged broadcasting service, a digital device, or a user. For instance, there may exist a charged broadcasting service board which is configured on the basis of a service provider equipped with a live channel and VOD, a charged broadcasting service board which is configured on the basis of a service provider equipped with an online live channel only, a charged broadcasting service board which is configured on the basis of a service provider equipped with a VOD only without a live content, and a charged broadcasting service board which is configured in a manner of combining at least one of the aforementioned boards. Hence, the second board can be variously configured and provided according to various references.

Meanwhile, a format of each content constructing a board includes a text, an image, a flash file (swf), xml, and the like. Moreover, the content may include a video or an audio file only.

Figure 20:
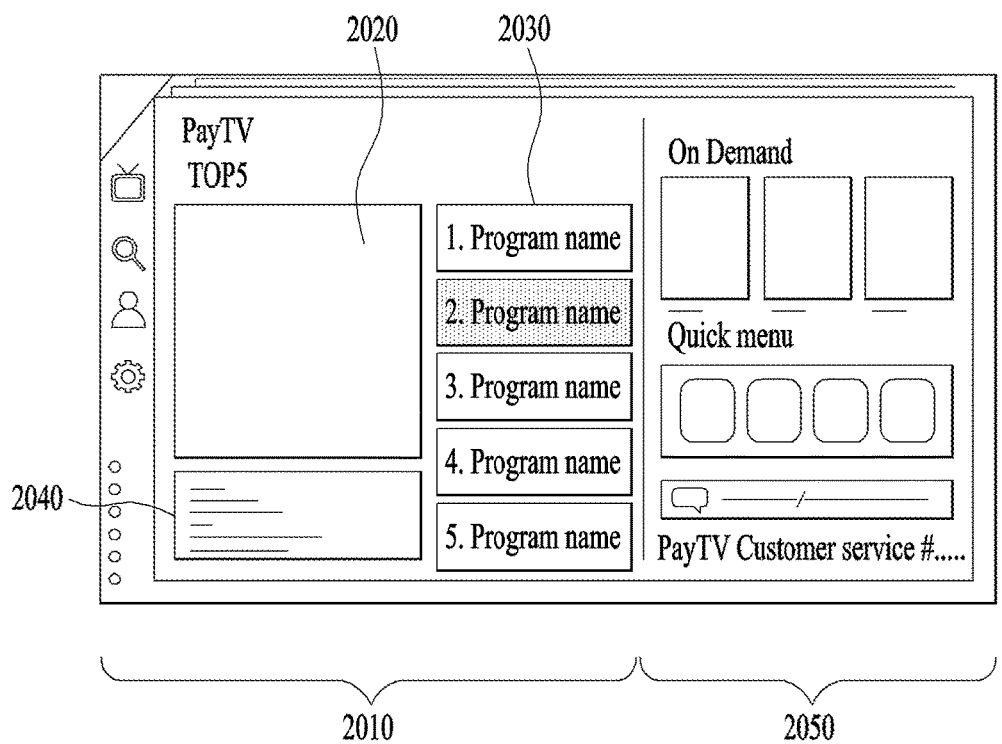
FIG. 20 is a diagram for explaining one embodiment of a configuration of a charged broadcasting service board configured according to the present invention.

FIG. 20 is a diagram for explaining one embodiment of a configuration of a charged broadcasting service board configured according to the present invention.

A charged broadcasting service board 2000 is mainly classified into two parts. A first part 2010 is an area in which live charged broadcasting service content is outputted and a second part 2050 is an area in which other service contents are outputted. In this case, a VOD service, a quick memo service, and the like can be provided in the second part 2050.

The first part 2010 plays at least one charged broadcasting service content (a video and the like) in a first area 2020 and provides a program name and the like of top five programs among the charged broadcasting service contents in a second area 2030. Meanwhile, at least one of sub items in the second area 2030 corresponds to the content provided in the first area 2020. By doing so, the content provided in the first area 2020 can be identified by a user in a manner of being differentiated from the sub items.

Meanwhile, detailed information on the item provided in the first area 2020 or the second area 2030 is provided in a third area 2040. For instance, if the user points at the first area 2020 using a pointer via the remote device, a control key, a playback bar, or the like used for a playback control of the content currently playing in the first area 2020 is provided in a prescribed area of the first area 2020 or the third area 2040. Or, such various detail information on the content provided via the first area 2020 as a video attribute, a video type, rating information, title information, a director, character information including a main character and the like, content schedule information, synopsis information, and the like can be provided in the third area 2040. If the user points at the second area 2030, the aforementioned process can be identically performed as well. In the foregoing description, a case of pointing (pointer over) an area and a case of clicking an area can provide a user with basic information and detail information, respectively.

Meanwhile, the second part 2050 provides information on a VOD service in the first area. Each item of the second part may include a thumbnail image (poster in promotion) of a corresponding content, a title, rating information, information on content price and the like. In this case, a list of the VOD service can be automatically looped from a number one in order and an interval can be randomly determined (e.g., 3 seconds).

A quick menu is provided in the second area. The quick menu can be randomly determined by a service provider of a corresponding charged service.

Besides, such contact information of the service provider of the charged service as a customer center telephone number, a fax, e-mail and the like, a notice provided by the service provider of the charged service and the like can be provided in the third area.

Figure 21:
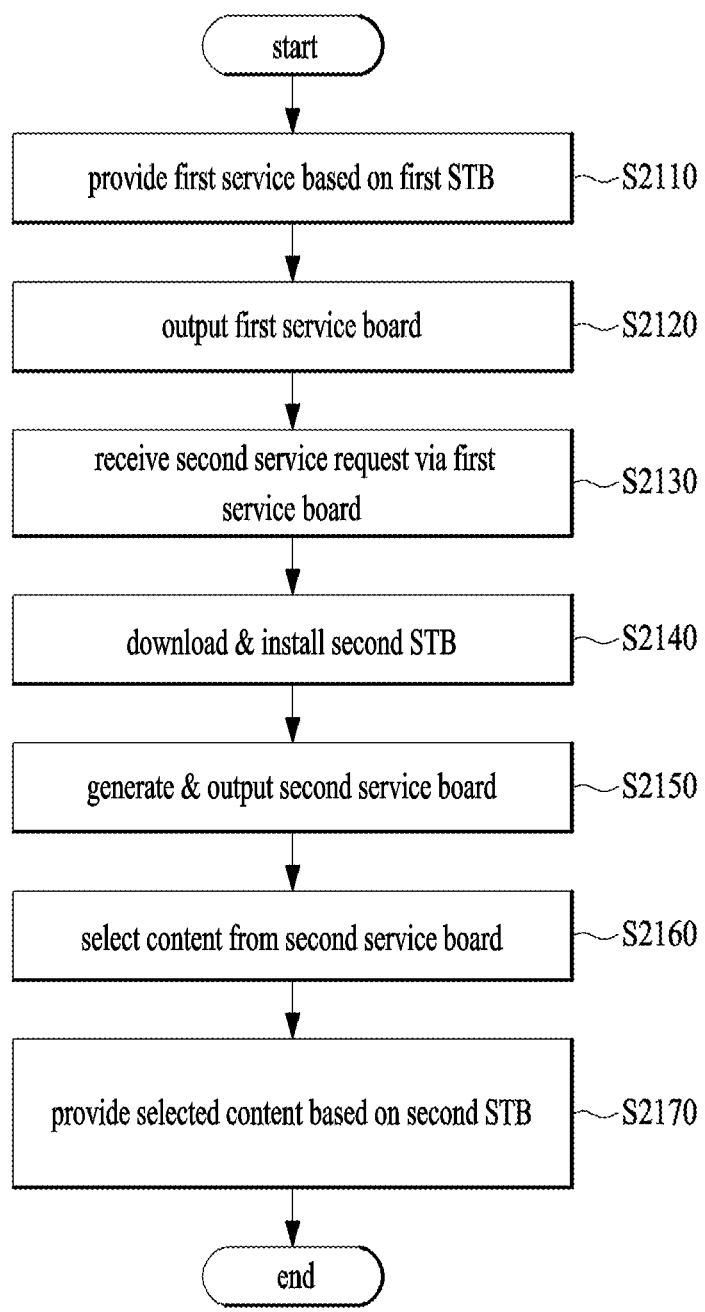
FIG. 21 is a flowchart for explaining one embodiment of a method of processing a charged service in a digital device according to the present invention.

FIG. 21 is a flowchart for explaining one embodiment of a method of processing a charged service in a digital device according to the present invention.

In the following description, a method of processing a service in the digital device is explained with reference to FIG. 21.

If power of the digital device is turned on, a first service is provided to a user based on a first STB (S2110). In this case, the first STB corresponds to a physical STB. Meanwhile, the first service is provided in an RF mode.

A first service board is outputted in the digital device according to a request of the user (S2120) and a second service request is received via the outputted first service board (S2130). In this case, the second STB corresponds to an STB application of a software form.

The digital device downloads and installs the second STB according to the second service request to process the second service (S2140).

The digital device generates and outputs a second service board based on the installed second STB (S2150) and receives a selection of a specific content regarding a second service from the outputted second service board (S2160).

Subsequently, the digital device provides the specific content selected in the step S2160 based on the second STB (S2170).

In the foregoing description, the second service is provided in a manner of being switched to an external input mode instead of the RF mode for the first service.

Meanwhile, in the foregoing description, the second service corresponds to a charged service.

The digital device receives a home screen entering request from the user after the first service is provided and may output the first service board in response to the home screen entering request.

Meanwhile, if the power is turned on, the digital device judges whether the first charged service is provided or the second service is provided before the power of the digital device is turned on and may be then able to determine a service board to be outputted among the first service board and the second service board according to a result of judging.

The aforementioned contents mainly describe a method of processing a single charged service. Yet, as mentioned in the foregoing description, a single charged service can be processed by one or more STB applications and the charged service or the STB application can be provided by one or more service providers.

Hence, in the present specification, a method of processing multi charged services is explained in detail with reference to attached drawings.

FIG. 22 is a diagram for explaining a method of processing multi charged services according to the present invention.

If it is assumed that an STB application is basically downloaded and installed in the digital device, a method of approaching a charged service according to the present invention is to i) switch an input mode from an RF mode to an external input mode (e.g., according to a selection of the STB application), ii) select the STB application in a premium board of a home service board for the RF mode, iii) select the STB application in a my app list of the home service board for the RF mode and the like. If the charged service is provided before the power of the digital device is turned off, it may be able to immediately approach the charged service when the power of the digital device is turned on in the future.

Yet, if a plurality of STB applications for multi charged services are installed in the digital device, a method of processing the multi charged services is not defined yet.

Referring to FIG. 22(a), a first service board 2210 for a charged service is outputted instead of a service board in the RF mode. In this case, referring to FIG. 22(a), a screen of a first charged service, which is processed by a first STB application, is provided in a first area 2212 in a PIP form and a plurality of STB applications 2214/2216, which are capable of being selected, installed in the digital device are outputted in a second area. For instance, FIG. 22(a) can be considered as the first service board.

In this case, if the user selects a second STB application 2216 in the second area of the first service board 2210, the digital device informs the user that the input mode has changed with a pop-up UI 2220 as depicted in FIG. 22(b) and outputs a second service board 2230 depicted in FIG. 22(c).

In this case, referring to the second service board 2230 of FIG. 22 (c), a screen of a second charged service, which is processed by the second STB application, is provided in a first area 2232 in a PIP form and a plurality of the STB applications, which are capable of being selected, are outputted in the second area as mentioned earlier in FIG. 22(a).

In the foregoing description, the first service board 2210 and the second service board 2230 can be outputted in a manner of being differentiated from a different STB application in order for a user to identify a corresponding STB application in the second area.

Meanwhile, as mentioned in the foregoing description, the first service board 2210 and the second service board 2230 may correspond to a service board separately generated according to an STB application or a service provider of a charged service. Or, as depicted in FIG. 22(a) or FIG. 22(c), such a data as an image, a video, a text, and the like outputted in the first area may be different from each other only depending on whether it is a single service board or a plurality STB applications in terms of a charged service.

Figure 23:
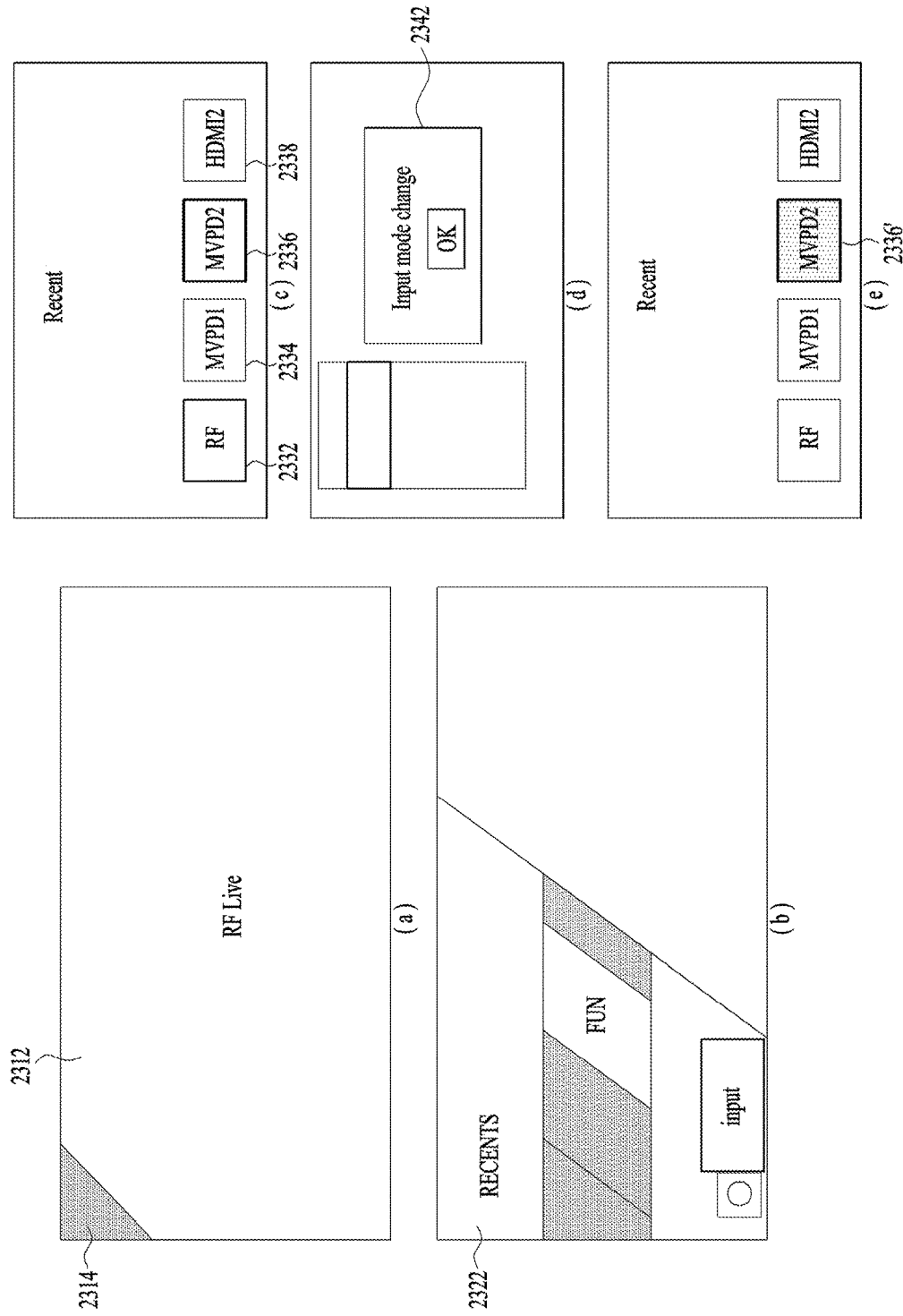
FIG. 23 is a diagram for explaining a method of providing a recent UI including a plurality of STB applications according to one embodiment of the present invention.

FIG. 23 is a diagram for explaining a method of providing a recent UI including a plurality of STB applications according to one embodiment of the present invention.

FIG. 23(a) corresponds to a screen 2312 on which a live broadcasting is provided in an RF mode. If a user moves a pointer to an edge of the screen, an icon 2314 for entering a resent list is outputted.

Referring to FIG. 23(a), if the user selects the icon 2314, a screen depicted in FIG. 23(b) is provided. Referring to FIG. 23(b), the recent list is provided in a first area 2322 on the screen 2312 on which the live broadcasting in the RF mode is provided. If the user selects an input mode item within the recent list of the first area, an UI depicted in FIG. 23(c) can be provided.

Referring to FIG. 23(c), such icons for the input mode as an RF 2332, a first STB 2334, a second STB 2336, a HDMI2 2338 and the like are outputted. The RF 2332 corresponding to a current input mode is provided in a manner of being differentiated from a different input mode.

In FIG. 23(c), if the first STB 2334 or the second STB 2336 icon is selected, a pop-up window 2342, which informs the user that the input mode has changed, is provided as depicted in FIG. 23(d). Finally, such a screen as depicted in FIG. 23(e) can be outputted.

Unlike FIG. 23(c), referring to FIG. 23(e), the second STB 2336' is outputted in order to make a user identify that second STB 2336' is a current input mode.

Figure 24:
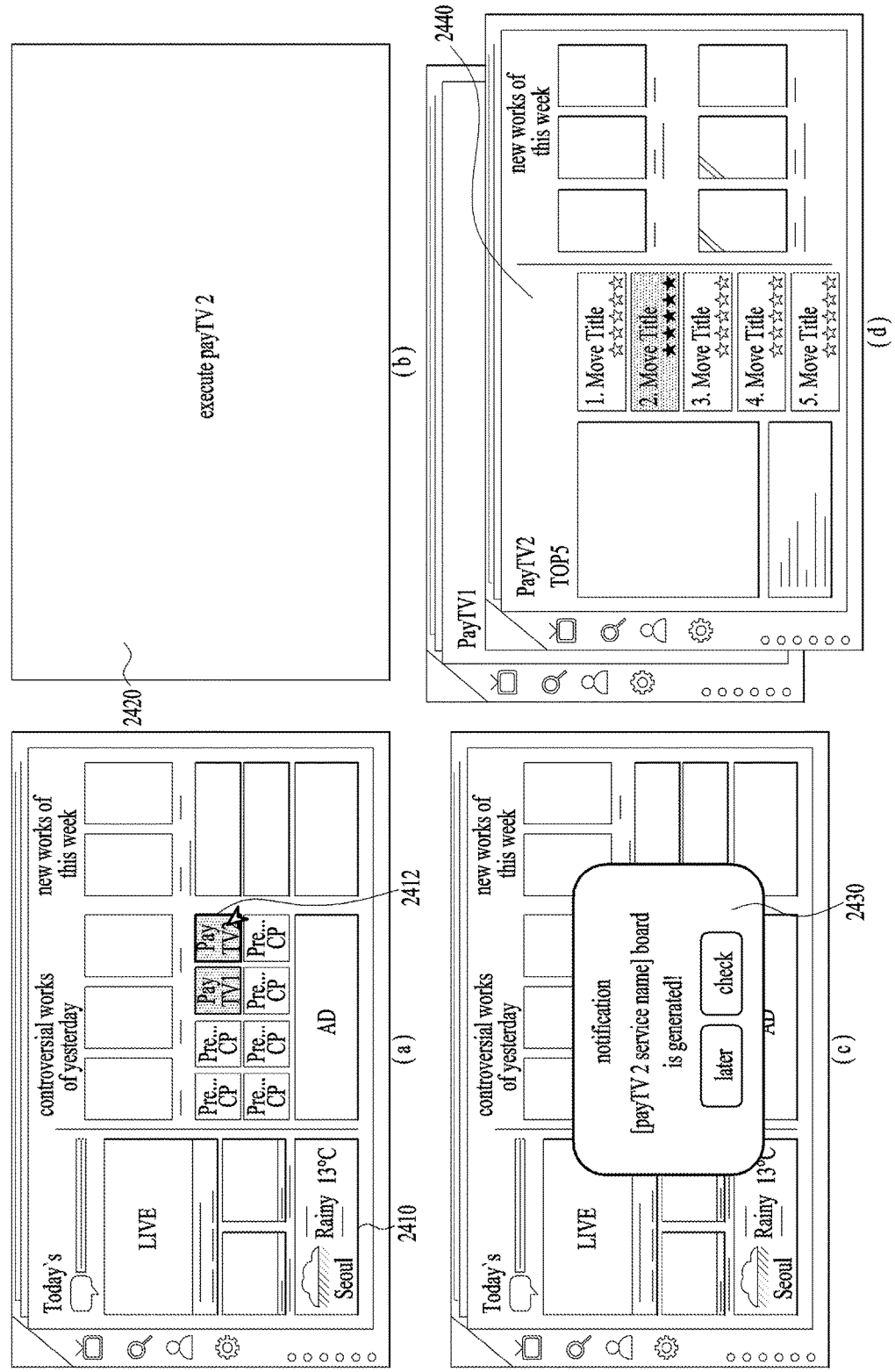
FIG. 24 and FIG. 25 are diagrams for explaining a method of generating a service board in relation to provision of multi charged services according to one embodiment of the present invention.
Figure 25:
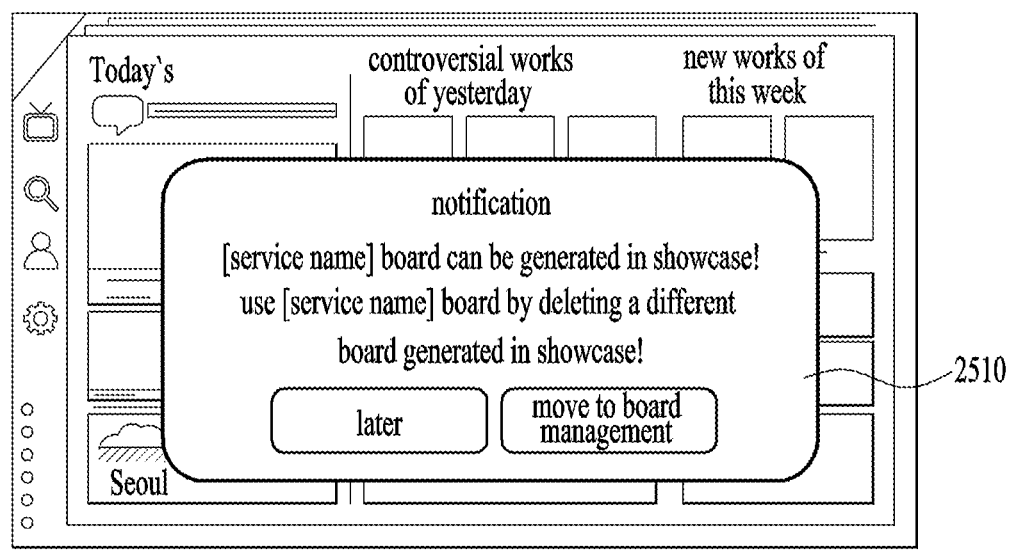

FIG. 24 and FIG. 25 are diagrams for explaining a method of generating a service board in relation to provision of multi charged services according to one embodiment of the present invention.

FIG. 24 relates to a method of generating a plurality of service boards in relation to multi charged services and FIG. 25 relates to a method of processing the charged service boards in case that the number of service boards exceeds the maximum number of service boards predetermined in the digital device in the process of generating the charged service board described in FIG. 24.

First of all, the charged service board according to the present invention may not be immediately generated despite an STB application has been downloaded and installed in the digital device. For instance, FIG. 24(a) depicts a service board 2410 in an RF mode. If at least one STB application is completely installed in the digital device, an icon or an item capable of being selected, which identifies the STB application installed in a premium board or a my app, is outputted.

Subsequently, if a user selects a second STB application 2412 depicted in FIG. 24(a), a second charged service 2420 processed by the second STB application is provided on a whole screen as depicted in FIG. 24(b). In this case, instead of immediately providing the second charged service 2420 depicted in FIG. 24(b), the digital device provides the charged service in case that a corresponding service provider succeeds in authenticating the user or the digital device.

Meanwhile, as mentioned in the foregoing description, if the service provider succeeds in authenticating the user or the digital device, the digital device generates a third service board 2440 for the second charged service. Yet, the generated third service board 2440 may correspond to a service board not immediately outputted. In other word, if the digital device enters the home screen again as depicted in FIG. 24(c) after FIG. 24(b), the digital device informs the user that the third service board 2440 for the second charged service depicted in FIG. 24(b) has been generated via a pop-up window 2430 and may receive a selection from the user whether to switch to the generated third service board 2440 from the current first service board 2410 for the RF mode or whether to check the second charged service.

Referring to FIG. 24(c), if the user intends to check the second charged service, the digital device may receive a selection of an input of the user in a manner of outputting the third service board 2440 as depicted in FIG. 24(d).

Meanwhile, referring to FIG. 24(d), the previously generated second service board for the first charged service and the aforementioned third service board 2440 are outputted in a layer structure using the aforementioned scheme and the selected third service board 2440 is outputted on a layer higher than the second service board.

Subsequently, if the user requests or switches a service board for a charged service, the digital device can output a specific service board among service boards layered according to a previously activated charged service type on a top layer. On the contrary, although a plurality of service boards are outputted in a layer structure in the present specification, a plurality of the service boards can be simultaneously outputted in a horizontally partitioned form or a vertically partitioned form as well. Or, the aforementioned latest service board is preferentially outputted and then the aforementioned latest service board may be switched to each of predetermined service boards as a pointer moves to an edge of a screen. In this case, a switching to a service board for the RF mode can be performed by an identical way.

Referring to FIG. 25, as mentioned in the foregoing description, a plurality of service boards can be generated in a single charged service based on a type, attribute, or the like of the service and a plurality of the service boards can also be generated based on a single STB application. This is selected or determined by a user, the digital device, or a service provider. Yet, the service board cannot be infinitely generated and the prescribed number of service boards may be determined as a maximum number.

Hence, if a last service board corresponding to the number set to the maximum number is generated, since the service board is maximally generated, the digital device generates an UI in a pop-up form to make the user identify that a new service board cannot be generated any more.

Subsequently, if the user makes a request for generation of a service board again, as depicted in FIG. 15(a), the digital device provides a notification pop-up message 2510 to the user. The notification pop-up message 2510 includes a 'move to board management' and a 'later' item. If the user selects the 'move to board management' item, the digital device outputs previously generated boards in a small size and may enable the user to selectively delete the boards.

If selective deletion is performed by the aforementioned scheme, the digital device can generate a new service board in response to the aforementioned request of the user.

Yet, if the user selects the 'later' item, the digital device randomly delete a service board among the charged service boards in time order or in an order of using the service boards and may be then able to respond to the request of generating a new service board of the user.

Or, if the 'later' item is selected, instead of deleting a previously generated service board, the digital device may provide a pop-up message informing the user that the request of generating a new service board cannot be preceded and may make an end of generating a service board.

Figure 26:
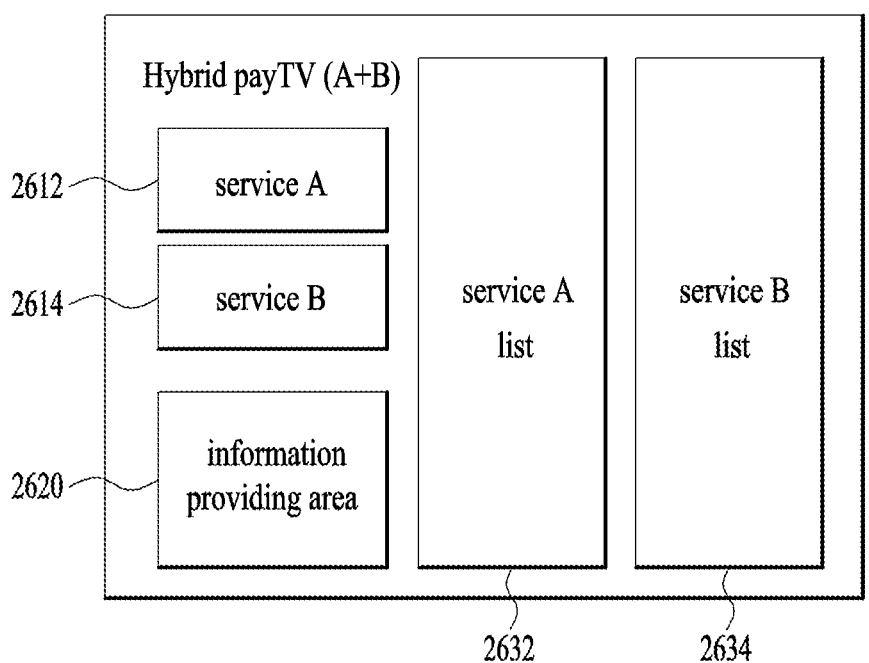
FIG. 26 and FIG. 27 are diagrams for explaining a hybrid service board configured according to one embodiment of the present invention.
Figure 27:
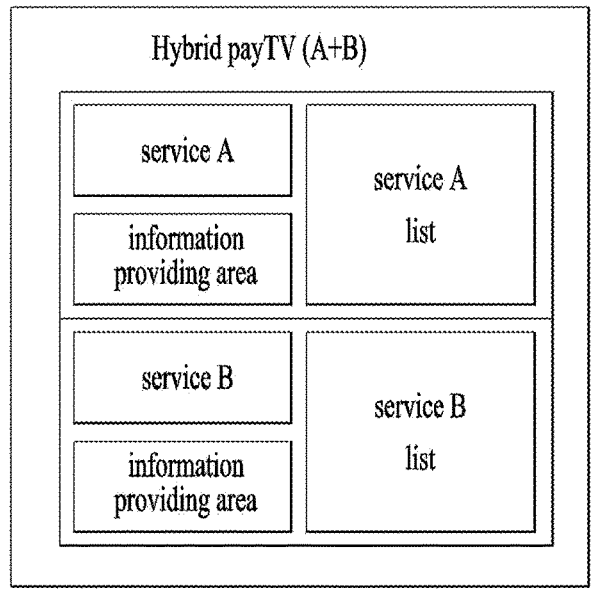

FIG. 26 and FIG. 27 are diagrams for explaining a hybrid service board configured according to one embodiment of the present invention.

Meanwhile, service boards respectively generated for a charged service based on a service provider or an STB application are explained in FIG. 24 to FIG. 25. Yet, if the digital device is able to support a plurality of STB applications or service providers, the digital device may generate and output a hybrid charged service board as depicted in FIG. 26 to FIG. 27. In this case, the aforementioned individual or single service board of FIG. 24 may or may not exist together with the hybrid charged service board.

FIG. 26 is a diagram of one embodiment of the hybrid charged service board. For clarity, one example of a service board configured by mixing or combining two services together is explained.

Referring to FIG. 26, a plurality of areas (service A, service B) in which videos are provided exist in a first area 2612/2614 and information on the service provided in the first area is provided in a second area 2620. Meanwhile, although there exist two areas in which videos are provided in FIG. 25 as the first area, this is just one example. There may exist one area only in which a video is provided. A representative service is selected from the two services (service A and service B) and a video for the representative service can be provided in the corresponding area. And, the information provided in the second area 2620 may provide information on each service, respectively or may provide information on the representative service only among the two services. Besides, the second area 2620 can output additional information provided by a service provider instead of the information on the video provided in the first area.

Lists (service A list 2632, service B list 2634) for each service can be individually provided in a third area in a manner of being vertically divided. Meanwhile, for instance, information provided in the third area is identical to the information provided in a corresponding area of an individual service board for a service as depicted in FIG. 24. Yet, a part of the information can be provided in the third area. To this end, the digital device may provide a scroll bar to a user to enable the user to scroll the information of each area left/right or up/down.

On the contrary, in providing a hybrid charged service board, FIG. 27 shows a method of providing an individual service board as depicted in FIG. 24 all at once in a manner of reducing the service board. Explanation on each service board is identical to the explanation on the contents described in FIG. 24 or FIG. 26. Meanwhile, by enabling the service board depicted in FIG. 24 or FIG. 27 to be scrolled left/right or up/down, a plurality of service boards can be searched by a single board.

Figure 28:
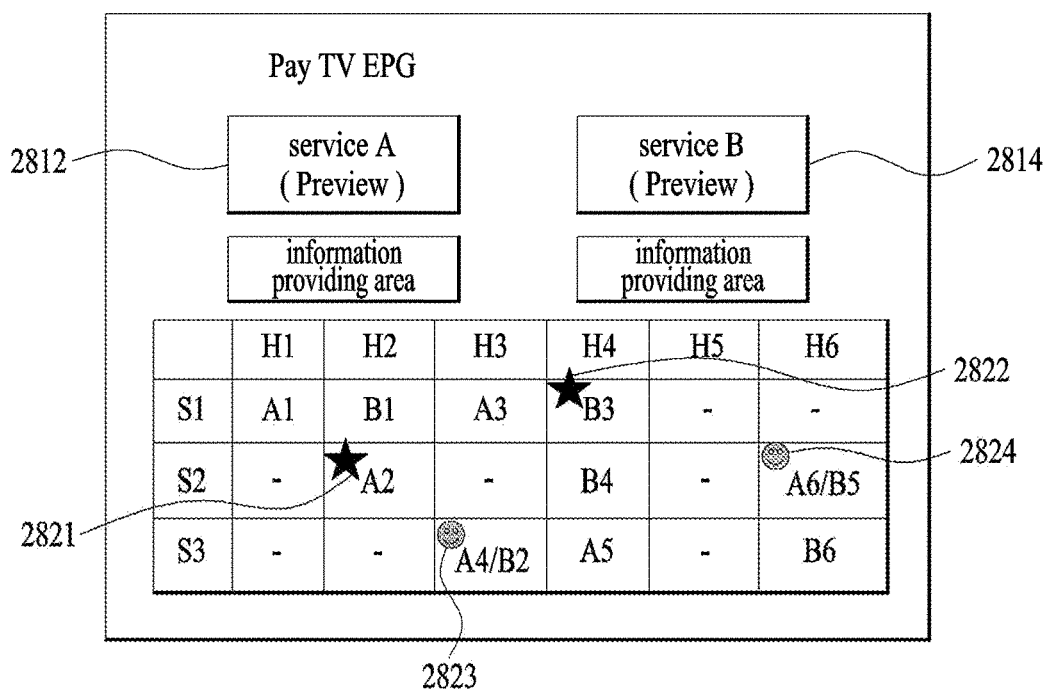

FIG. 28 and FIG. 29 are diagrams for explaining a hybrid EPG configured according to one embodiment of the present invention.

An EPG can be called via the service board configured as depicted in FIG. 24 and used. Although it is not depicted in FIG. 24 since FIG. 24 shows a case of a single charged service, an EPG configuration is identical to that for a legacy broadcasting service.

Yet, if an EPG is requested via the hybrid service board depicted in FIG. 26 or FIG. 27, it is necessary to simultaneously configure and provide guide information on a plurality services.

FIG. 28 is one embodiment of a hybrid EPG configuration and FIG. 29 is a different embodiment of the hybrid EPG configuration.

First of all, referring to FIG. 28, a preview area exists in a first area. In this case, there may exist one preview area or a plurality of preview areas as many as mixed services. Since FIG. 28 assumes that there are two services, FIG. 28 depicts that there exist a preview area 2812 for a service A and a preview area 2814 for a service B. Yet, as mentioned in the foregoing description, there may exist a preview for a representative service only.

Content information according to time (H) and service (channel) (S) is outputted in a second area.

For instance, future time is sequentially provided in a horizontal direction from H1 to H6 on the basis of a prescribed unit (e.g., 1 hour) and services are provided in a vertical direction from S1 to S3. In this case, because of the nature of the hybrid EPG, contents for the service A and contents for the service B are arranged in each position in a manner of being distinguished from each other. For instance, A1 content of the service A is outputted in a H1-S1 section, B1 content of the service B is outputted in a H2-S1 section, A3 content of the service A is outputted in a H3-S1 section, B3 content of the service B is outputted in a H4-S1 section, A2 content of the service A is outputted in a H2-S2 section, B4 content of the service B is outputted in a H4-S2 section, A6 content of the service A and B5 content of the B service are outputted in a H6-S2 section, A4 content of the service A and B2 content of the service B are outputted in a H3-S3 section, A5 content of the service A is outputted in a H4-S3 section, and B6 content of the service B is outputted in a H6-S3 section.

In the foregoing description, a star icon is marked on both the A2 content of the service A and the B3 content of the service B. This may mean a preferred content or a preferred service. Meanwhile, in the foregoing description, it may represent a preferred content or a preferred service using separate icons for the service A and the service B, respectively. Besides, such various functions as a recoding reservation, time machine, immediate recording, 2D/3D, SD/HD, and the like, attribute, information on view ratings, and the like can be provided together using a different icon.

Meanwhile, referring to FIG. 28, a plurality of service contents are simultaneously provided in the H3-S3 and the H6-S2 section. In this case, it may mean that the A4 service content is identical to the B2 service content and the A6 service content is identical to the B5 service content, respectively. Or, it just means that the A4 service content and the B2 service content are provided in an identical time and service and the A6 service content and the B5 service content are provided in an identical time and service, respectively. For instance, in the former case, a content tile is provided to a user only and the user can select a service among the service A and the service B to receive the service from one of them. And, although each service, i.e., the service A and the service B correspond to contents identical to each other in attribute, the contents may be different from each other according to environment for providing the contents, network environment, service price, and the like. Hence, if the user selects a corresponding item, the digital device provides information on the selected item to the user based on the information received from a service provider and may process the selection for a service provider or a service of the user. In this case, if the user does not select a specific service, a service provider or a service selected as a preferred service can be preferentially provided to the user. As depicted in FIG. 28, the service provider or the service selected as the preferred service can be provided to the user by a predetermined icon or indicator 2821 or 2824 to make the user intuitively identify the service.

Meanwhile, in FIG. 28, if a user selects a preview image of the first area or a specific item in the second area, the digital device can operate in response to the preview image or the specific item. For instance, if the user selects the A5 item while a preview for the A1 is currently provided in the service A preview area of the first area, the digital device can provide a preview for the A5 item in the preview area instead of the preview for the A1.

Besides, for instance, if the user points at the preview area for the service A for more than a prescribed time, items for the service B disappear from the second area or is blurry provided compared to the service A item. By doing so, the digital device can make the user more easily identify the service A content only.

In FIG. 28, although a part of time and a part of services are provided to a user according to a size of a screen, resolution, and the like. Yet, the user can search for a different time slot and a different service using a scroll function capable of scrolling up/down or left/right of a screen.

On the contrary, FIG. 29 is a diagram for a full EPG, which is outputted on a screen in a manner of being individually configured according to each service. In particular, for a single service, a preview area is provided in the left side and content items are provided in the right side on the basis of time and service.

An EPG is configured for each service and arranged as depicted in FIG. 29. The EPG for a plurality of services more than two services can be checked at the same time via up/down or left/right scroll.

Figure 30:
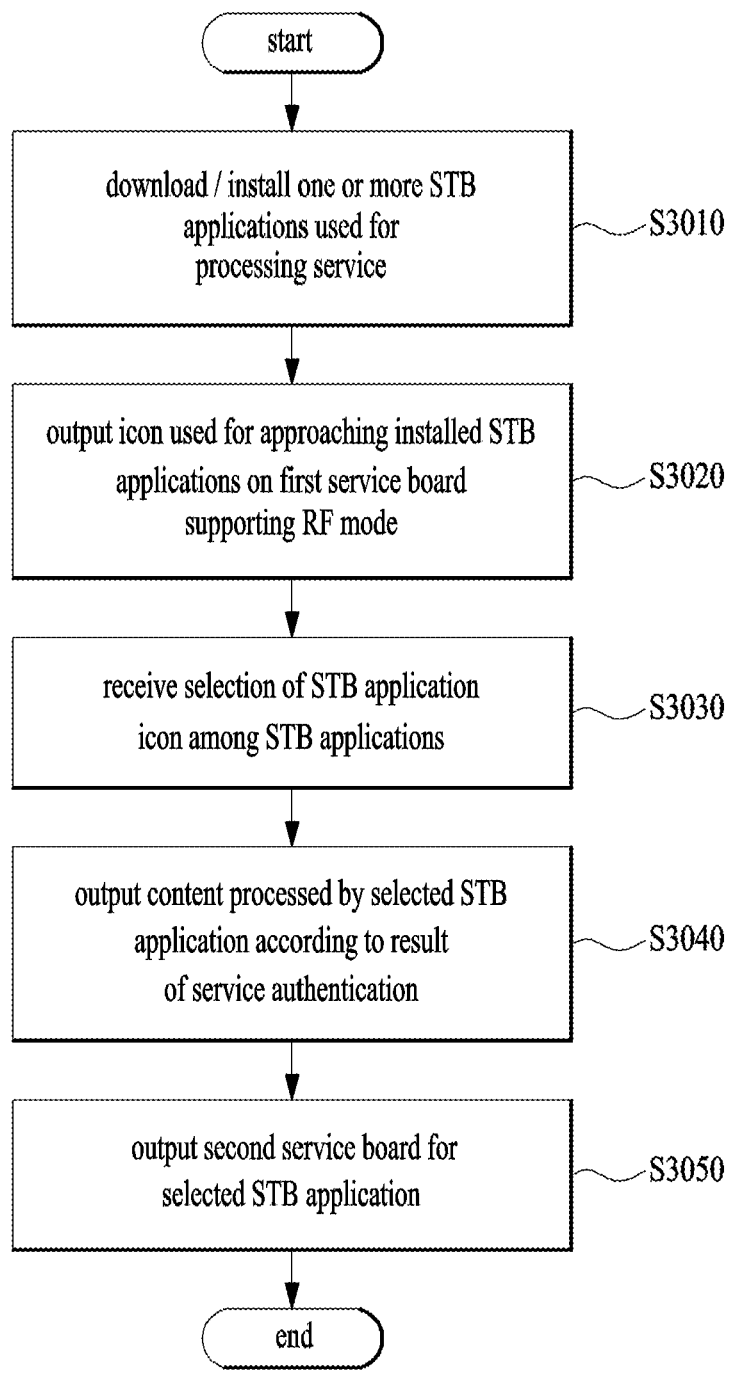
FIG. 30 is a flowchart for explaining a method of providing multi charged services according to one embodiment of the present invention.

FIG. 30 is a flowchart for explaining a method of providing multi charged services according to one embodiment of the present invention.

The digital device downloads and installs one or more STB applications configured to process a service in the digital device (S3010).

The digital device outputs an icon configured to approach the installed STB applications on a first service board supporting an RF mode (S3020).

The digital device receives a selection of an STB application icon among the STB applications (S3030) and outputs content processed by the selected STB application according to a service authentication result (S3040). Simultaneously or subsequently, the digital device outputs a second service board for the selected STB application (S3050).

In the foregoing description, the STB application is different from a physical STB supporting the RF mode. And, the outputted content is outputted in a manner of being switched to an external input mode instead of the RF mode and the service corresponds to a charged service.

Subsequently, having received a home screen entering request, the digital device determines a service board to be outputted among the first service board supporting the RF mode and the generated second service board in response to the home screen entering request and may be then able to output the determined service board.

Meanwhile, each of the service boards generated for the STB applications is outputted in a layer structure. If the number of generated service boards exceeds the predetermined maximum number of the service boards set to the digital device, the digital device may output a message indicating that an additional service board is unable to be generated.

And, the generated service board can be outputted in a manner of being included in an external input list.

According to the aforementioned present invention, a charged service processing configuration of a new form capable of processing various charged services including a charged broadcasting service provided by a legacy physical STB can be defined. And, the present invention can provide a service system configured to process a charged service via the charged service processing configuration, a digital device, and a method of processing the charged broadcasting service. Moreover, the present invention can provide a method of approaching, configuring, and processing a charged service in the digital device via the charged service processing configuration. Various charged services can be used in the digital device via a plurality of charged service processing configurations.

A service system disclosed in the present specification, a digital device, and a method of processing a service may be non-limited to the aforementioned configurations and method of embodiments. The embodiments may be composed in a manner that a whole or a part of the each of the embodiments is selectively combined to achieve various modifications.

Meanwhile, a method of operating a digital device disclosed in the present invention can be implemented with a code readable by a processor in a recording media readable by the processor, which is equipped in the digital device. The recording media readable by the processor may include all kinds of recording devices for storing data capable of being read by the processor. The examples of the recording media readable by the processor may include a ROM (read only memory), a RAM (random access memory), a CD-ROM, a magnetic tape, a floppy disc, an optical data storing device and the like. And, implementing in a form of a carrier wave such as a transmission via an internet and the like is also included. The recording media readable by the processor are distributed to the computer systems connected by a network and codes readable by the processor can be stored and executed in a manner of being distributed.

While the present invention has been described and illustrated herein with reference to the preferred embodiments and diagrams thereof, the present invention may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

What is claimed is:

1. A method of switching between multiple modes for a live broadcasting in a smart television, the method comprising:
    displaying the live broadcasting in an RF mode, wherein the live broadcasting in the RF mode is received via a physical set top box or a tuner;
    downloading at least one set-top box (STB) application from a corresponding server via a wired or wireless network, wherein the at least one STB application is capable of processing multiple charged services including a charged broadcasting service used to be provided by the physical STB;
    installing the at least one STB application in a memory;
    displaying an icon approaching the at least one STB application installed in the memory;
    switching the RF mode to a G-IP mode without connecting to the physical STB in response to selecting the icon;
    executing the at least one STB application; and
    displaying the live broadcasting in the G-IP mode, wherein the G-IP mode performs based on the at least one STB application installed in the memory.

2. The method of claim 1, further comprising:
    checking whether the G-IP mode is set if power to the smart television is turned on; and
    providing a home screen based on the G-IP mode if the G-IP mode is set to the smart television.

3. The method of claim 2, further comprising:
    determining a user or the smart television has subscribed for the charged broadcasting service or not;
    executing the at least one STB application for the charged broadcasting service if the user or the smart television corresponds to a subscriber of the charged broadcasting service; and
    providing a subscription guide page or subscription inducement page for the charged broadcasting service if the user or the smart television does not correspond to the subscriber of the charged broadcasting service.

4. The method of claim 3, further comprising:
    displaying an external input list in response to a first signal received from a remote controller, wherein the external input list comprises the icon; and
    switching the RF mode to the G-IP mode in response to a second signal received from the remote controller, wherein the second signal is used for selecting the icon.

5. The method of claim 1, wherein the physical set top box is comprised of hardware for processing a broadcast signal.

6. The method of claim 5, wherein the smart television is connectable to the physical set top box.

7. A smart television for switching between multiple modes for a live broadcasting, the smart television, comprising:
a tuner configured to receive a signal for the live broadcasting;
a display configured to display the live broadcasting in an RF mode, wherein the live broadcasting in the RF mode is received via a physical set top box or the tuner;
a memory configured to download and install at least one set top box (STB) application from a corresponding server via a wired or wireless network, wherein the at least one STB application is capable of processing multiple charged services including a charged broadcasting service used to be provided by the physical STB; and
a controller coupled to the tuner, the display and the memory,
wherein the controller is configured to:
display an icon approaching the at least one STB application installed in the memory,
switch the RF mode to a G-IP mode without connecting to the physical STB in response to selecting the icon,
execute the at least one STB application, and
control the display to display the live broadcasting in the G-IP mode, wherein the G-IP mode performs based on the at least one STB application installed in the memory.

8. The smart television of claim 7, wherein the controller is further configured to:
check whether the G-IP mode is set if power to the smart television is turned on, and
provide a home screen based on the G-IP mode if the G-IP mode is set to the smart television.

9. The smart television of claim 8, wherein the controller is further configured to:
determine a user or the smart television has subscribed for the charged broadcasting service or not,
execute the at least one STB application for the charged broadcasting service if the user or the smart television corresponds to a subscriber of the charged broadcasting service, and
provide a subscription guide page or subscription inducement page for the charged broadcasting service if the user or the smart television does not correspond to the subscriber of the charged broadcasting service.

10. The smart television of claim 9, wherein the controller is further configured to:
control the display to display an external input list in response to a first signal received from a remote controller, wherein the external input list comprises the icon, and
switch the RF mode to the G-IP mode in response to a second signal received from the remote controller, wherein the second signal is used for selecting the icon.

11. The smart television of claim 7, wherein the physical set top box is comprised of hardware for processing the broadcast signal.

12. The smart television of claim 11, wherein the smart television is connectable to the physical set top box.

* * * * *